(12) United States Patent
Kotzur et al.

(10) Patent No.: US 11,163,501 B2
(45) Date of Patent: Nov. 2, 2021

(54) RAID STORAGE MULTI-STEP COMMAND SYSTEM

(71) Applicant: Dell Products L.P., Round Rock, TX (US)

(72) Inventors: Gary Benedict Kotzur, Austin, TX (US); William Emmett Lynn, Round Rock, TX (US); Kevin Thomas Marks, Georgetown, TX (US); Chandrashekar Nelogal, Round Rock, TX (US); James Peter Giannoules, Round Rock, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 16/832,348

(22) Filed: Mar. 27, 2020

(65) Prior Publication Data
US 2021/0096780 A1 Apr. 1, 2021

Related U.S. Application Data

(63) Continuation-in-part of application No. 16/585,296, filed on Sep. 27, 2019, now Pat. No. 11,093,180.

(51) Int. Cl.
*G06F 3/06* (2006.01)
*G06F 11/10* (2006.01)

(52) U.S. Cl.
CPC .......... *G06F 3/0689* (2013.01); *G06F 3/0619* (2013.01); *G06F 3/0629* (2013.01); *G06F 3/0658* (2013.01); *G06F 3/0659* (2013.01); *G06F 11/10* (2013.01)

(58) Field of Classification Search
CPC .... G06F 3/0689; G06F 3/0629; G06F 3/0619; G06F 3/0658; G06F 3/0659; G06F 3/0607; G06F 3/0656; G06F 11/10
See application file for complete search history.

(56) References Cited

U.S. PATENT DOCUMENTS

| 9,229,854 | B1 | 1/2016 | Kuzmin et al. | |
| 2007/0233952 | A1* | 10/2007 | Tanaka | G06F 3/0605 711/114 |
| 2021/0042032 | A1* | 2/2021 | Yokoi | G06F 3/0683 |

* cited by examiner

*Primary Examiner* — Masud K Khan
*Assistant Examiner* — Trung-Hao Joseph Nguyen
(74) *Attorney, Agent, or Firm* — Joseph Mencher

(57) ABSTRACT

A RAID storage multi-step command system includes a RAID storage system coupled to a RAID storage controller device. The RAID storage controller device identifies a RAID storage system configuration of the RAID storage system and, based on the RAID storage system configuration, generates a first multi-step command definition file for a first RAID storage device in the RAID storage system, and transmits it to the first RAID storage device. The first multi-step command definition file defines first steps that each include first operation(s). Subsequent to transmitting the first multi-step command definition file, the RAID storage controller device generates a first multi-step command that references the first multi-step command definition file and includes first parameter(s) for use in performing each first operation(s) included in the first steps defined by the first multi-step command definition file, and transmits the first multi-step command to the first RAID storage device.

20 Claims, 18 Drawing Sheets

| ROLE | ADDR. 1 | ADDR. 2 | ADDR. 3 | LENGTH | PARA. | STEPS |
|---|---|---|---|---|---|---|
| WRITE WITH BUFFER | PHY. MEMORY (SOURCE) | LOG. MEMORY (DESTINATION) | PHY. MEMORY (DESTINATION) | # LBA | N/A | ADDR. 1 > ADDR. 2; ADDR. 1 > ADDR. 3 |
| WRITE WITH XOR | PHY. MEMORY (SOURCE) | LOG. MEMORY (SOURCE/DEST) | PHY. MEMORY (DESTINATION) | # LBA | COUNT (OPTIONAL) | XOR(ADDR. 1, ADDR. 2) > ADDR. 3; ADDR. 1 > ADDR. 2 [OPTIONAL > REPEAT PER COUNT] |
| GENERATE Q | PHY. MEMORY (SOURCE) | PHY. MEMORY (SOURCE) | LOG. MEMORY (DESTINATION) | # LBA | MULTIPLICAND & POSITION | GF(PARA., (ADDR. 1, ADDR. 2)) > ADDR. 3 |
| DATA MANIPULATION | PHY. MEMORY/LOG. MEMORY (SOURCE) | PHY. MEMORY/LOG. MEMORY (SOURCE) | PHY. MEMORY/LOG. MEMORY (DESTINATION) | # LBA | OPERATOR | ADDR. 1 (OPERATOR) ADDR. 2 > ADDR. 3 |

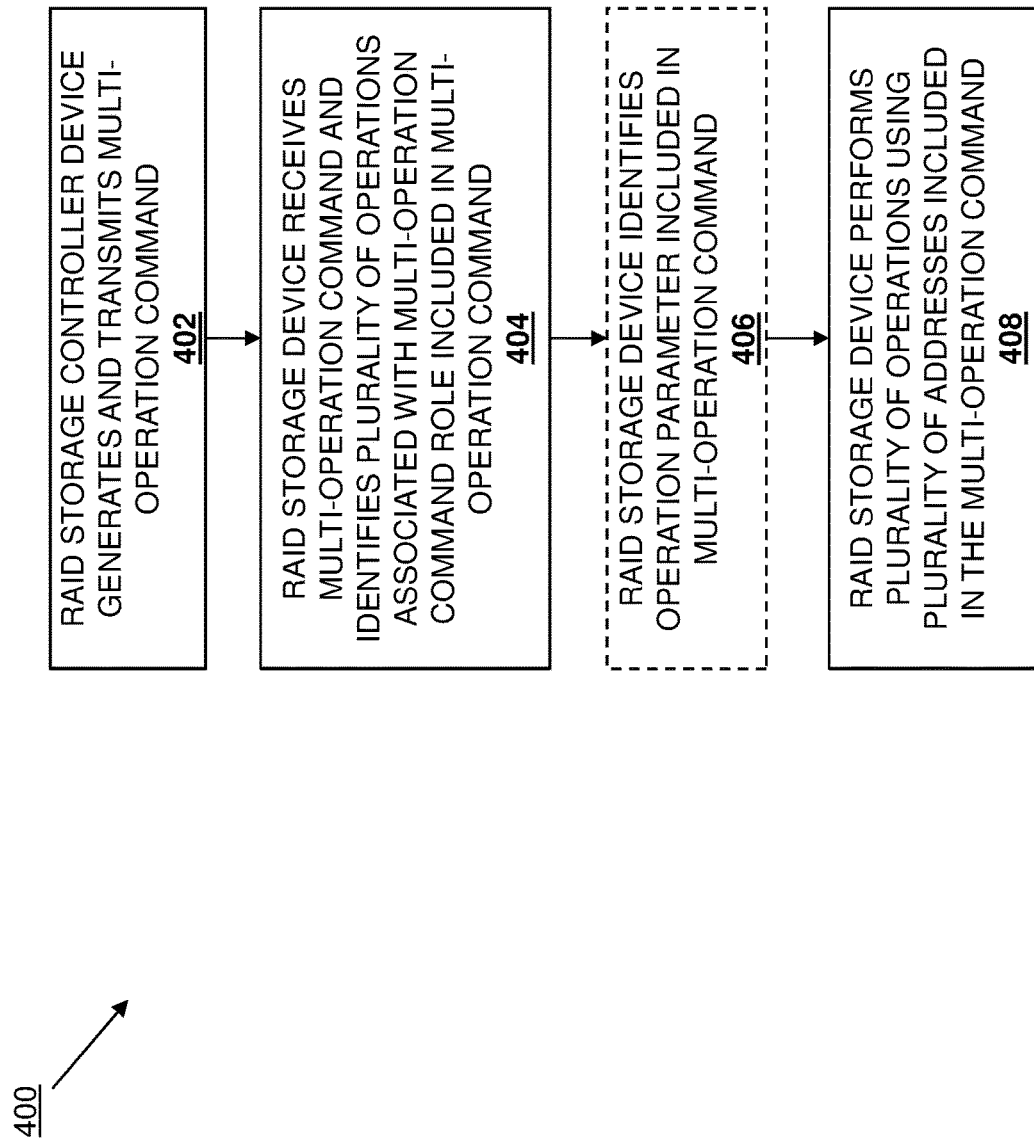

| ROLE | ADDR. 1 | ADDR. 2 | ADDR. 3 | LENGTH | PARA. | STEPS |
|---|---|---|---|---|---|---|
| WRITE WITH BUFFER | PHY. MEMORY (SOURCE) | LOG. MEMORY (DESTINATION) | PHY. MEMORY (DESTINATION) | # LBA | N/A | ADDR. 1 > ADDR. 2;<br>ADDR. 1 > ADDR. 3 |
| WRITE WITH XOR | PHY. MEMORY (SOURCE) | LOG. MEMORY (SOURCE/DEST) | PHY. MEMORY (DESTINATION) | # LBA | COUNT (OPTIONAL) | XOR(ADDR. 1, ADDR. 2) > ADDR. 3;<br>ADDR. 1 > ADDR. 2<br>[OPTIONAL > REPEAT PER COUNT] |
| GENERATE Q | PHY. MEMORY (SOURCE) | PHY. MEMORY (SOURCE) | LOG. MEMORY (DESTINATION) | # LBA | MULTIPLICAND & POSITION | GF(PARA., (ADDR. 1, ADDR. 2)) > ADDR. 3 |
| DATA MANIPULATION | PHY. MEMORY/LOG. MEMORY (SOURCE) | PHY. MEMORY/LOG. MEMORY (SOURCE) | PHY. MEMORY/LOG. MEMORY (DESTINATION) | # LBA | OPERATOR | ADDR. 1 (OPERATOR) ADDR. 2 > ADDR. 3 |

| ROLE | ADDR. 1 | ADDR. 2 | ADDR. 3 | LENGTH | PARA. | STEPS |
|---|---|---|---|---|---|---|
| WRITE | PHY. MEMORY (SOURCE) | LOG. MEMORY (DESTINATION) | N/A | # LBA | N/A | ADDR. 1 > ADDR. 2; |
| RAID 1 WRITE | PHY. MEMORY (SOURCE) | LOG. MEMORY (DESTINATION) | PHY. MEMORY (DESTINATION) | # LBA | N/A | ADDR. 1 > ADDR. 2 ADDR. 1 > ADDR. 3 |
| RAID 5 PARITY WRITE | PHY. MEMORY (SOURCE) | PHY. MEMORY (SOURCE) | LOG. MEMORY (DESTINATION) | # LBA | N/A | XOR(ADDR. 1, ADDR. 2) > ADDR. 3 |
| RAID 5 PARITY PARTIAL WRITE 1 | PHY. MEMORY (SOURCE) | LOG. MEMORY (SOURCE/DEST) | N/A | # LBA | N/A | XOR(ADDR. 1, ADDR. 2) > ADDR. 2 |
| RAID 5 PARITY PARTIAL WRITE 2 | PHY. MEMORY (SOURCE) | LOG. MEMORY (SOURCE/DEST) | PHY. MEMORY (DESTINATION) | # LBA | N/A | XOR(XOR(ADDR. 1, ADDR. 2), ADDR. 3 > ADDR. 2 |
| RAID 5 COMPUTE | PHY. MEMORY (SOURCE) | PHY. MEMORY (SOURCE) | PHY. MEMORY (DESTINATION) | # LBA | N/A | XOR(ADDR. 1, ADDR. 2) > ADDR. 3 |
| RAID 5 RECOVERY INTERIM | PHY. MEMORY (SOURCE) | LOG. MEMORY (DESTINATION) | PHY. MEMORY (DESTINATION) | # LBA | N/A | XOR(ADDR. 1, ADDR. 2) > ADDR. 3 |
| RAID 5 DATA PARTIAL WRITE | PHY. MEMORY (SOURCE) | LOG. MEMORY (SOURCE/DEST) | PHY. MEMORY (DESTINATION) | # LBA | N/A | XOR(ADDR. 1, ADDR. 2) > ADDR. 2 ADDR. 2 > ADDR. 3 |

700A

700B

| ROLE | ADDR. 1 | ADDR. 2 | ADDR. 3 | LENGTH | PARA. | STEPS |
|---|---|---|---|---|---|---|
| RAID 6 UPDATE | PHY. MEMORY (SOURCE) | LOG. MEMORY (SOURCE) | PHY. MEMORY (DESTINATION) | # LBA | N/A | GF MULTIPLY(ADDR. 1, ADDR. 2) > ADDR. 3 |
| RAID 6 COMPUTE 1 | PHY. MEMORY (SOURCE) | PHY. MEMORY (SOURCE) | PHY. MEMORY (DESTINATION) | # LBA | N/A | GF MULTIPLY(ADDR. 1, ADDR. 2) > ADDR. 3 |
| RAID 6 COMPUTE 2 | PHY. MEMORY (SOURCE) | N/A | PHY. MEMORY (DESTINATION) | # LBA | $G^Y$ INDEX, EXP | GF MULTIPLY(GFLOG$_Y$, ADDR. 1) > ADDR. 3 |
| RAID 6 RECOVERY 1 | PHY. MEMORY (SOURCE) | N/A | PHY. MEMORY (DESTINATION) | # LBA | $G^X$, $G^Y$ INDEX, EXP | GF INVERSE MULTIPLY(XOR(GFILOG$_X$, GFILOG$_Y$), ADDR. 1) > ADDR. 3 |
| RAID 6 RECOVERY 2 | PHY. MEMORY (SOURCE) | LOG. MEMORY (DESTINATION) | N/A | # LBA | $G^X$, $G^Y$ INDEX, EXP | GF INVERSE MULTIPLY(XOR(GFILOG$_X$, GFILOG$_Y$), ADDR. 1) > ADDR. 2 |
| RAID 6 TABLES GENERATION | N/A | N/A | N/A | N/A | POLY, N | |

| ROLE | ADDR. 1 | ADDR. 2 | ADDR. 3 | LENGTH | PARA. | STEPS |
|---|---|---|---|---|---|---|
| READ | PHY. MEMORY (DESTINATION) | LOG. MEMORY (SOURCE) | N/A | #LBA | N/A | ADDR. 2 > ADDR. 1 |
| COPY | PHY. MEMORY (DESTINATION) | N/A | PHY. MEMORY (SOURCE) | #LBA | N/A | ADDR. 3 > ADDR. 1 |
| ACQUIRE LOCK | N/A | LOG. MEMORY (DESTINATION) | N/A | #LBA | N/A | |
| RELEASE LOCK | N/A | LOG. MEMORY (DESTINATION) | N/A | #LBA | N/A | |
| ACQUIRE LOCK AND READ | PHY. MEMORY (SOURCE) | LOG. MEMORY (DESTINATION) | N/A | #LBA | N/A | ADDR. 2 > ADDR. 1 |

RAID STORAGE MULTI-STEP COMMAND SYSTEM

RELATED APPLICATIONS

This application is a continuation-in-part of U.S. patent application Ser. No. 16/585,296, filed on Sep. 27, 2019, the disclosure of which is incorporated herein by reference in its entirety.

BACKGROUND

The present disclosure relates generally to information handling systems, and more particularly to providing multi-step commands to Redundant Array of Independent Disk (RAID) storage devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems sometime utilize storage systems such as those provided by a Redundant Array of Independent Disks (RAID) storage system that includes a plurality of RAID storage devices. As will be appreciated by one of skill in the art, RAID storage systems are provided by a data storage virtualization technology that combines the physical RAID storage devices into one or more logical storage units for the purposes of data redundancy, performance improvements, and/or other benefits known in the art. For example, data in a RAID storage system may be distributed across the RAID storage devices using several different techniques that are referred to as "RAID levels" that depend on a desired level of redundancy and performance (e.g., RAID 0, RAID 1, RAID 5, RAID 6, and so on), with each RAID level providing a different balance among goals that include reliability, availability, performance, and capacity. However, the introduction of new storage technologies for use in RAID storage systems has been found to raise some issues.

For example, Non-Volatile Memory express (NVMe) storage devices (e.g., NVMe Solid State Drive (SSD) storage devices) utilize an open logical device interface specification for accessing its non-volatile storage media (e.g., provided by NAND flash memory devices) via a Peripheral Component Interconnect express (PCIe) bus to provide low latency, internal parallelism, and/or other benefits known in the art. However, NVMe storage devices present a challenge when utilized with RAID storage systems because the aggregate performance of the NVMe storage devices is typically much greater than the performance capabilities of the RAID storage controller provided for the RAID storage system (and is even projected to be much greater than the performance capabilities of next-generation RAID storage controllers), which results in those RAID storage controllers unable to manage more than a few NVMe storage devices (e.g., conventional RAID storage controllers are capable of managing approximately four NVMe storage devices). As such, the use of NVMe storage devices in RAID storage subsystems present RAID storage system scaling issues, as the RAID storage controllers cannot scale with more than a few NVMe storage devices.

Accordingly, it would be desirable to provide a RAID storage system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Redundant Array of Independent Disks (RAID) storage controller engine that is configured to: identify a RAID storage system configuration of a RAID storage system that includes a plurality of RAID storage devices; generate, based on the RAID storage system configuration, a first multi-step command definition file for a first RAID storage device that is included in the plurality of RAID storage devices, wherein the first multi-step command definition file defines a plurality of first steps that each include at least one first operation; transmit the first multi-step command definition file to the first RAID storage device; generate, subsequent to transmitting the first multi-step command definition file, a first multi-step command that references the first multi-step command definition file and includes at least one first parameter for use in performing one or more first operations included in the plurality of first steps defined by the first multi-step command definition file; and transmit the first multi-step command to the first RAID storage device.

BRIEF DESCRIPTION OF THE DRAWINGS

FIG. 4 is a flow chart illustrating an embodiment of a method for executing multi-operation commands by RAID storage devices.

FIG. 5 is a schematic view illustrating an embodiment of a multi-operation command table.

FIG. 7A is a table view illustrating a multi-operation command table that include multi-operation commands that may be implemented in the RAID storage system of FIG. 2 operating during the method of FIG. 4.

FIG. 7B is a table view illustrating a multi-operation command table that include multi-operation commands that may be implemented in the RAID storage system of FIG. 2 operating during the method of FIG. 4.

FIG. 7C is a table view illustrating a multi-operation command table that include multi-operation commands that may be implemented in the RAID storage system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
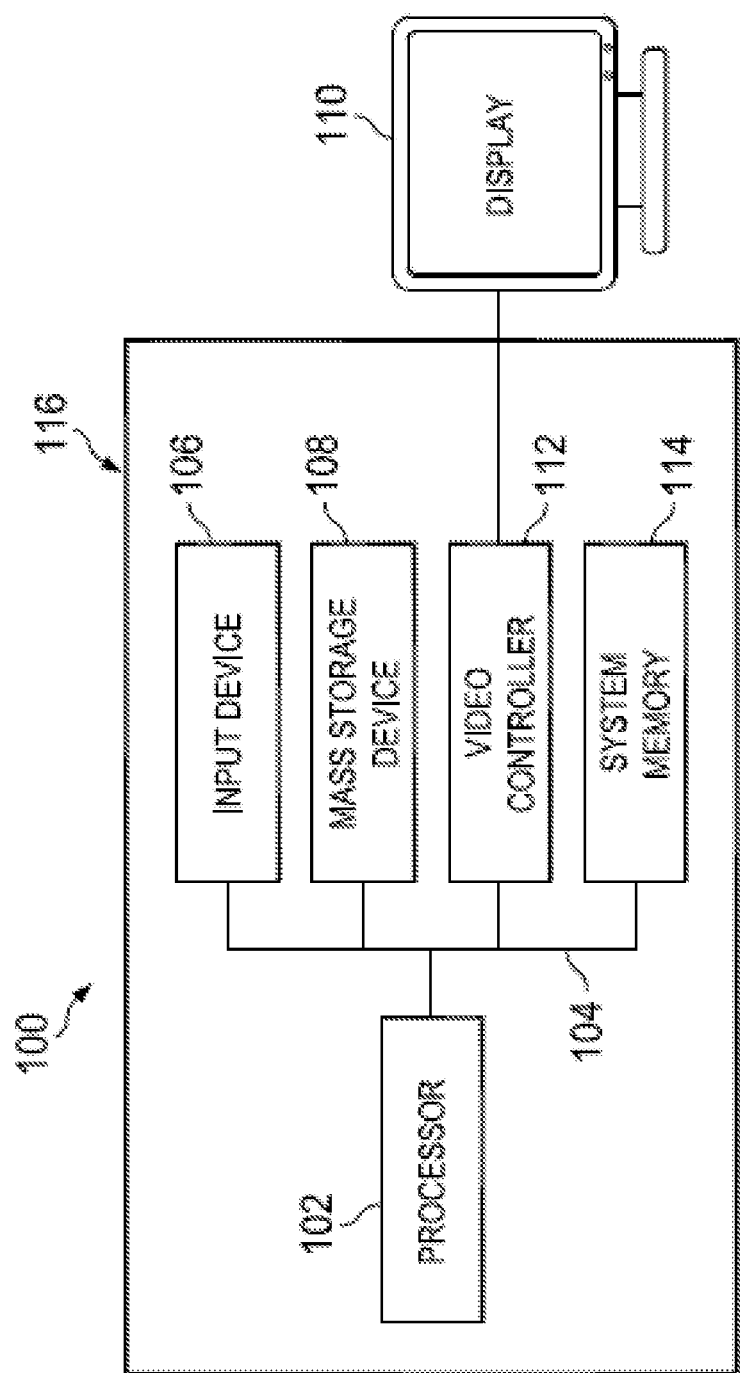
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
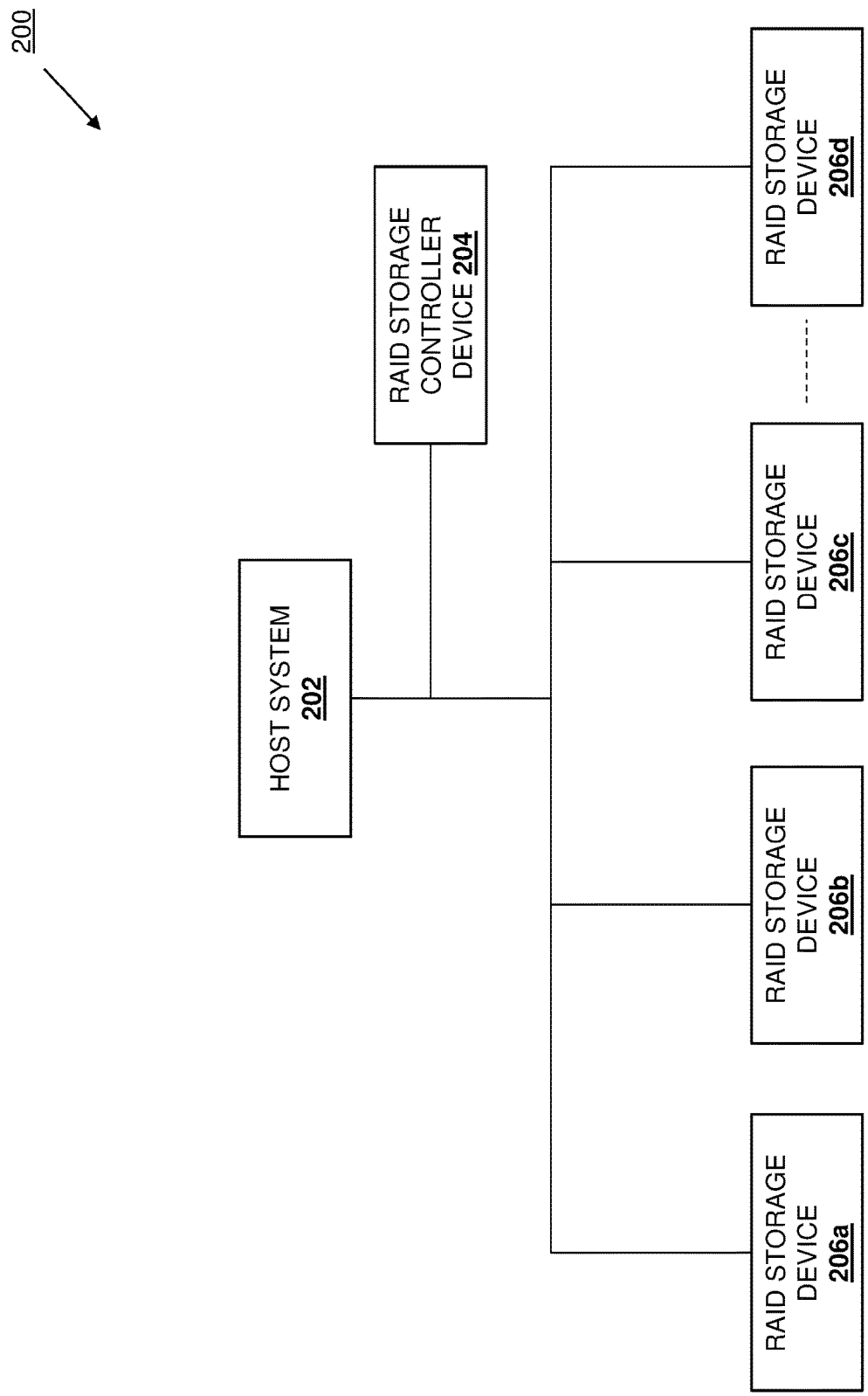
FIG. 2 is a schematic view illustrating an embodiment of a RAID storage system.

Referring now to FIG. 2, an embodiment of a Redundant Array of Independent Disks (RAID) storage system 200 is illustrated. In the illustrated embodiment, the RAID storage system 200 includes a host system 202. In an embodiment, the host system 202 may be provided by the IHS 100 discussed above with reference to FIG. 1, and/or may include some or all of the components of the IHS 100. For example, the host system 202 may include server device(s), desktop computing device(s), a laptop/notebook computing device(s), tablet computing device(s), mobile phone(s), and/or any other host devices that one of skill in the art in possession of the present disclosure would recognize as operating similarly to the host system 202 discussed below. In the illustrated embodiment, the RAID storage system 200 also includes a RAID storage controller device 204 that is coupled to the host system 202 and that may be provided by the IHS 100 discussed above with reference to FIG. 1, and/or may include some or all of the components of the IHS 100. For example, the RAID controller system 204 may include any storage device/disk array controller device that is configured to manage physical storage devices and present them to host systems as logical units.

Furthermore, in the illustrated embodiment, the RAID storage system 200 also includes a plurality of RAID storage devices 206a, 206b, 206c, and up to 206d, each of which is coupled to the host system 202 and the RAID storage controller device 204. While a few RAID storage devices 206a-206d are illustrated, one of skill in the art in possession of the present disclosure will recognize that many more storage devices may (and typically will) be coupled to the RAID storage controller device 204 (e.g., in a datacenter) while remaining within the scope of the present disclosure. In the embodiments discussed below, the RAID storage devices 206a-206d are described as being provided by Non-Volatile Memory express (NVMe) Solid State Drive (SSD) drives, but one of skill in the art in possession of the present disclosure will recognize that other types of storage devices with similar functionality as the NVMe SSD drives (e.g., NVMe PCIe add-in cards, NVMe M.2 cards, etc.) may be implemented according to the teachings of the present disclosure and thus will fall within its scope as well. While a specific RAID storage system 200 has been illustrated and described, one of skill in the art in possession of the present disclosure will recognize that the RAID storage system of the present disclosure may include a variety of components and component configurations while remaining within the scope of the present disclosure as well.

Figure 3:
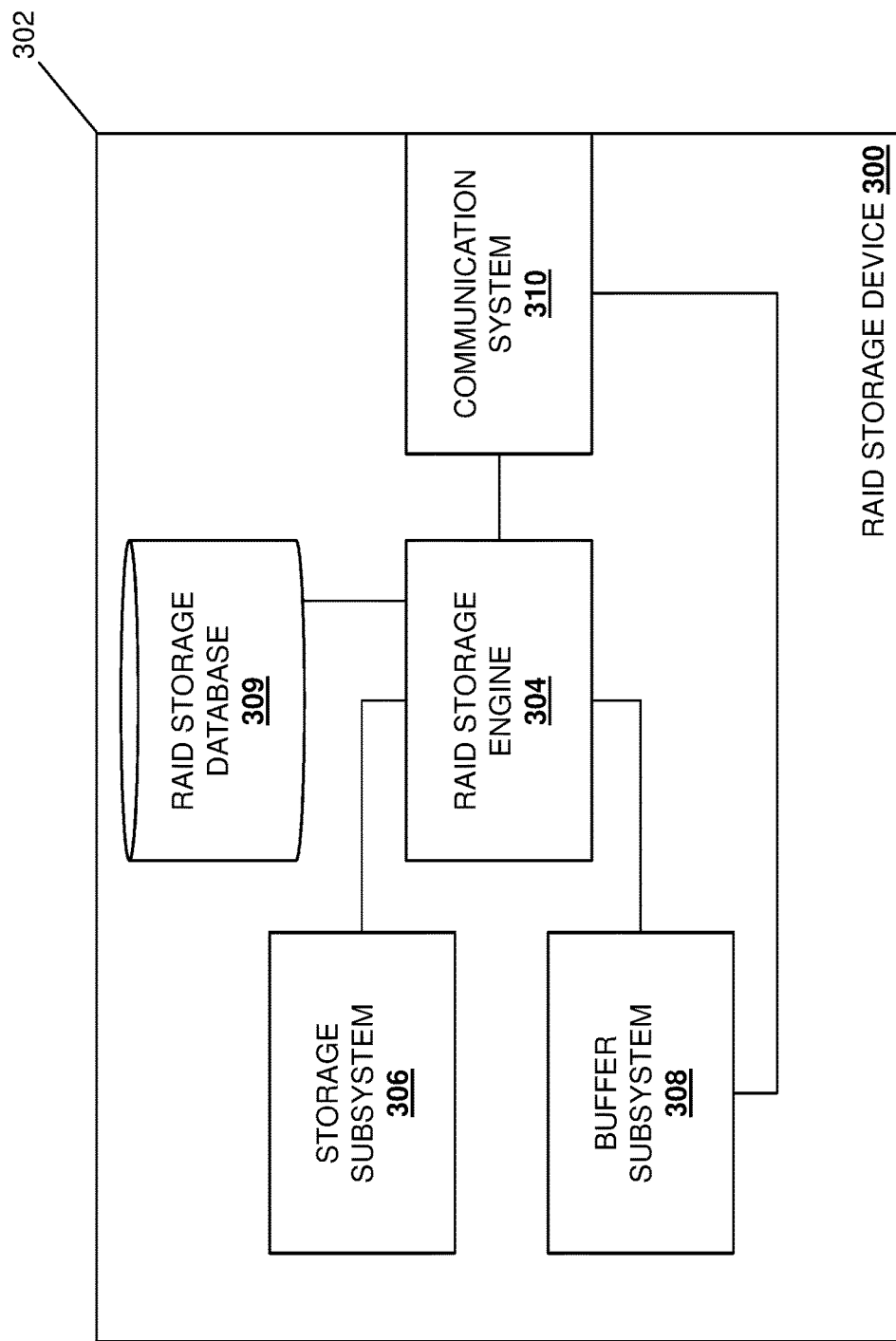
FIG. 3 is a schematic view illustrating an embodiment of a RAID storage device provided in the RAID storage system of FIG. 2.

Referring now to FIG. 3, an embodiment of a RAID storage device 300 is illustrated that may provide any or all of the RAID storage devices 206a-206d discussed above with reference to FIG. 2. As such, the RAID storage device 300 may be provided by an NVMe SSD storage devices, but one of skill in the art in possession of the present disclosure will recognize that other types of storage devices with similar functionality as the NVMe SSDs (e.g., NVMe PCIe add-in cards, NVMe M.2 cards, etc.) may be implemented according to the teachings of the present disclosure and thus will fall within its scope as well. In the illustrated embodiment, the RAID storage device 300 includes a chassis 302 that houses the components of the RAID storage device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage engine 304 that is configured to perform the functionality of the RAID storage engines and/or RAID storage devices discussed below. While not illustrated, one of skill in the art in possession of the present disclosure will recognize that the RAID storage engine 304 may include, or be coupled to, other components such as queues (e.g., the submission queues and completion queues discussed below) and/or RAID storage device components that would be apparent to one of skill in the art in possession of the present disclosure.

The chassis 302 may also house a storage subsystem 306 that is coupled to the RAID storage engine 304 (e.g., via a coupling between the storage subsystem 306 and the processing system). Continuing with the example provided above in which the RAID storage device 300 is an NVMe SSD storage device, the storage subsystem 306 may be provided by a flash memory array such as, for example, a plurality of NAND flash memory devices. However, one of skill in the art in possession of the present disclosure will recognize that the storage subsystem 306 may be provided using other storage technologies while remaining within the scope of the present disclosure as well. The chassis 302 may also house a buffer subsystem 308 that is coupled to the RAID storage engine 304 (e.g., via a coupling between the buffer subsystem 308 and the processing system). Continuing with the example provided above in which the RAID storage device 300 is an NVMe SSD storage device, the buffer subsystem 308 may be provided by a Controller Memory Buffer (CMB). However, one of skill in the art in possession of the present disclosure will recognize that the buffer subsystem 308 may be provided using other buffer technologies while remaining within the scope of the present disclosure as well. The chassis 302 may also house a storage system (not illustrated, but which may be provided by the storage device 108 discussed above with reference to FIG. 1) that is coupled to the RAID storage engine 304 (e.g., via a coupling between the storage system and the processing system) and that includes a RAID storage database 309 that is configured to storage any of the information utilized by the RAID storage engine 304 as discussed below.

The chassis 302 may also house a communication system 310 that is coupled to the RAID storage engine 304 (e.g., via a coupling between the communication system 310 and the processing system) and the buffer subsystem 308, and that may be provided by any of a variety of storage device communication technologies and/or any other communication components that would be apparent to one of skill in the art in possession of the present disclosure. Continuing with the example provided above in which the RAID storage device 300 is an NVMe SSD storage device, the communication system 310 may include any NVMe SSD storage device communication components that enable the Direct Memory Access (DMA) operations described below, as well as any other NVMe SDD storage device communication functionality that would be apparent to one of skill in the art in possession of the present disclosure. While a specific RAID storage device 300 has been illustrated, one of skill in the art in possession of the present disclosure will recognize that RAID storage devices (or other devices operating according to the teachings of the present disclosure in a manner similar to that described below for the RAID storage device 300) may include a variety of components and/or component configurations for providing conventional RAID storage device functionality, as well as the functionality discussed below, while remaining within the scope of the present disclosure as well.

Referring now to FIG. 4, an embodiment of a method 400 for executing multi-operation commands by RAID storage devices is illustrated. As discussed below, the systems and methods of the present disclosure provide for the generation and transmission of multi-operation commands by a RAID storage controller device to a RAID storage device, with the RAID storage device that receives that multi-operation command configured to perform multiple operations identified using that multi-operation command using a plurality of addresses identified in the multi-operation command. For example, the multi-operation command may identify a multi-operation command role and the plurality of addresses, and the RAID storage device receiving that multi-operation command may identify a plurality of operations associated the multi-operation command role in a database. The RAID storage device may then perform the plurality of operations using the plurality of addresses. In a specific example, the performance of the operations using the plurality of addresses may include retrieving first data located in a first address in the plurality of addresses, retrieving second data located in a second address in the plurality of addresses, performing an XOR operation on the first data and the second data to produce third data, and writing the third data to one or more third addresses in the plurality of addresses. However, as discussed below, a variety of other operations may be performed, and in some embodiments, may include the use of an operational parameter included in the multi-operation command. As such, RAID storage controller devices may send a single command that is configured to cause a RAID storage device to perform multiple operations, rather than sending a respective command for each of those operations, thus increasing the ability of the RAID storage controller device to scale with high performance RAID storage devices.

The method 400 begins at block 402 where a RAID storage controller device generates and transmits a multi-operation command. In an embodiment, at block 402, the RAID storage controller device 204 may receive an instruction from the host system 202 and, in response, may generate and transmit a multi-operation command to any of the RAID storage devices 206a-206d based on that instruction. With reference to FIG. 5, a multi-operation command table 500 illustrates a few specific examples of multi-operation commands that are discussed in further detail below. However, as discussed below, a variety of other multi-operation commands may be provided according to the teachings of the present disclosure while remaining within its scope as well. In the illustrated embodiment, the multi-operation command table 500 includes a multi-operation command role column that, as discussed in further detail below, may identify a multi-operation command role that is utilized by a RAID storage device to identify operational steps included in the multi-operation command associated with that multi-operation command role. The multi-operation command table 500 also includes a plurality of addresses columns such as the first address column (e.g., "ADDR. 1"), the second address column (e.g., ADDR. 2), and the third address column (e.g., "ADDR. 3) in the illustrated embodiment, each of which identifies an address that may be utilized to perform operations in a multi-operation command. The multi-operation command table 500 also includes a length column and a parameter column (e.g., "PARA.") that may identify a length and a parameter that may be utilized to perform operations in a multi-operation command. The multi-operation command table 500 also includes a steps column that identifies the operational steps performed for a multi-operation command. One of skill in the art in possession of the present disclosure will recognize that the multi-operation command table 500 is provided to allow a discussion of the multi-operation commands of the present disclosure, and that multi-operation commands may differ from those illustrated and described below in the multi-operation command table 500 while remaining within the scope of the present disclosure as well.

As such, in one specific example of block 402, the RAID storage controller device 204 may receive an instruction from the host system 202 that requires the writing of data from the host system 202 to both the storage subsystem 306 and the buffer subsystem 308 in the RAID storage device 206b and, in response, may determine that a multi-operation command with a "WRITE WITH BUFFER" multi-operation command role is required based on that instruction. As such, with reference to the multi-operation command table 500, the RAID storage controller device 204 may generate a multi-operation command that includes a WRITE WITH BUFFER multi-operation command role. Furthermore, that multi-operation command may identify a physical memory source address (or virtual memory source address that is later translated into a physical memory source address) that is included in the host system 202 (e.g., "PHY. MEMORY (SOURCE)") and that identifies a physical memory location on the host system 202 that includes data that is to-be written to the RAID storage device 206b, a logical memory destination address that is included in the RAID storage device 206b (e.g., "LOG. MEMORY (DESTINATION)") and that identifies a logical memory location in the storage subsystem 306 on the RAID storage device 206 to which the data from the host system 202 will be written, and a physical memory destination address that is included in the RAID storage device 202b (e.g., "PHY. MEMORY (DESTINATION)" and that identifies a physical memory location in the buffer subsystem 308 (e.g., a CMB) on the RAID storage device 206b to which the data from the host system 202 will be written as well. Furthermore, that multi-operation command may include a length (e.g., "#LBA") that identifies how many blocks/Logical Block Addresses (LBAs) of data are being transferred as part of the multi-operation command. As can be seen in the multi-operation command table 500, the illustrated embodiment of the multi-operation command associated with the WRITE WITH BUFFER multi-operation command role does not include a parameter value.

In another specific example of block 402, the RAID storage controller device 204 may receive an instruction from the host system 202 that requires the writing of data from the host system 202 to the RAID storage device 206b, along with the performance of an XOR operation using the data from the host system 202 and data on the RAID storage device 206b and, in response, may determine that a multi-operation command with a "WRITE WITH XOR" multi-operation command role is required based on that instruction. As such, with reference to the multi-operation command table 500, the RAID storage controller device 204 may generate a multi-operation command that includes a WRITE WITH XOR multi-operation command role. Furthermore, that multi-operation command may identify a physical memory source address that is included on the host system 202 (e.g., "PHY. MEMORY (SOURCE)") and that identifies a physical memory location on the host system 202 that includes data that is to-be written to the RAID storage device 206b, a logical memory source and destination address that is included in the RAID storage device 206b (e.g., "LOG. MEMORY (SOURCE/DEST)") and that identifies a logical memory location in the storage subsystem 306 on the RAID storage device 206 that both includes data that is to be used in the XOR operation with the data from the host system 202 and provides the location that the data from the host system 202 should be written to, and a physical memory destination address that is included in the RAID storage device 202b (e.g., "PHY. MEMORY (DESTINATION)" and that identifies a physical memory location in the storage subsystem 306 on the RAID storage device 206b to which the results of the XOR operation will be written. Furthermore, that multi-operation command may include a length (e.g., "#LBA") that identifies how many blocks/ Logical Block Addresses (LBAs) of data are being transferred as part of the multi-operation command, and may include an optional count parameter value (e.g., "COUNT (OPTIONAL)") that may be used to indicate a number of times the multi-operation command should be repeated, discussed in further detail below.

In another specific example of block 402, the RAID storage controller device 204 may receive an instruction from the host system 202 that requires the writing of data from the host system 202 to the RAID storage device 206b, along with a Galois Field (GF) operation using the data from the host system 202 and data on the RAID storage device 206b and, in response, may determine that a multi-operation command with a "GENERATE Q" multi-operation command role is required based on that instruction. As such, with reference to the multi-operation command table 500, the RAID storage controller device 204 may generate a multi-operation command that includes a GENERATE Q multi-operation command role. Furthermore, that multi-operation command may identify a physical memory source address that is included in the host system 202 (e.g., "PHY. MEMORY (SOURCE)") and that identifies a physical memory location on the host system 202, a physical memory source address that is included in the RAID storage device 206b (e.g., "PHY. MEMORY (SOURCE)") and that identifies a physical memory location in the storage subsystem 306 of the RAID storage device 206b, and a logical memory destination address that is included in the RAID storage device 202b (e.g., "LOG. MEMORY (DESTINATION)" and that identifies a logical memory location in the storage subsystem 306 on the RAID storage device 206b to which the results of the GF operation will be written. Furthermore, that multi-operation command may include a length (e.g., "#LBA") that identifies how many blocks/Logical Block Addresses (LBAs) of data are being transferred as part of the multi-operation command, and may include a multiplicand and position parameter value from the gf Log and gfiLog tables to calculate Galios Field syndromes, discussed in further detail below.

In another specific example of block 402, the RAID storage controller device 204 may receive an instruction from the host system 202 that requires an operation to be performed on data from any addresses (e.g., an address on the host system 202 and an address on the RAID storage device 206b in the example below), and that provides for the writing of the results of that operation to any address (e.g., on the RAID storage device 206b in the examples below) and, in response, may determine that a multi-operation command with a "DATA MANIPULATION" multi-operation command role is required based on that instruction. As such, with reference to the multi-operation command table 500, the RAID storage controller device 204 may generate a multi-operation command that includes a DATA MANIPULATION multi-operation command role. Furthermore, that multi-operation command may identify a physical memory or logical memory source address that is included in the host system 202 (e.g., "PHY. MEMORY/LOG. MEMORY (SOURCE)") and that identifies a physical or logical memory location on the host system 202 that includes data to-be operated on, a physical memory or logical memory source address that is included in the RAID storage device 206b (e.g., "PHY. MEMORY/LOG. MEMORY (SOURCE)") and that identifies a physical or logical memory location in the storage subsystem 306 on the RAID storage device 206 that includes data to-be operated on, and a physical memory or logical memory destination address that is included in the RAID storage device 202b (e.g., "PHY. MEMORY/LOG. MEMORY (DESTINATION)" and that identifies a physical or logical memory location in the storage subsystem 306 on the RAID storage device 206b to which the results of the operation will be written. As will be recognized by one of skill in the art in possession of the present disclosure, commands associated with the DATA MANIPULATION multi-operation command roles discussed above may include an indicator of whether a memory location is physical or logical.

Furthermore, that multi-operation command may include a length (e.g., "#LBA") that identifies how many blocks/Logical Block Addresses (LBAs) of data are being transferred as part of the multi-operation command, and may include an operator parameter value that includes the operator to be applied to the data being operated on, discussed in further detail below. However, while the address detailed in the example above are described in a particular order, one of skill in the art in possession of the present disclosure will recognize that those addresses may be provided in different orders while remaining within the scope of the present disclosure as well. For example, the physical memory or logical destination address described above that is included in the RAID storage device 202b (e.g., "PHY. MEMORY/LOG. MEMORY (DESTINATION)") and that identifies a physical or logical memory location in the storage subsystem 306 on the RAID storage device 206b to which the results of the operation will be written may instead be included on the host system 202 (or other storage systems) while remaining within the scope of the present disclosure as well.

Figure 6:
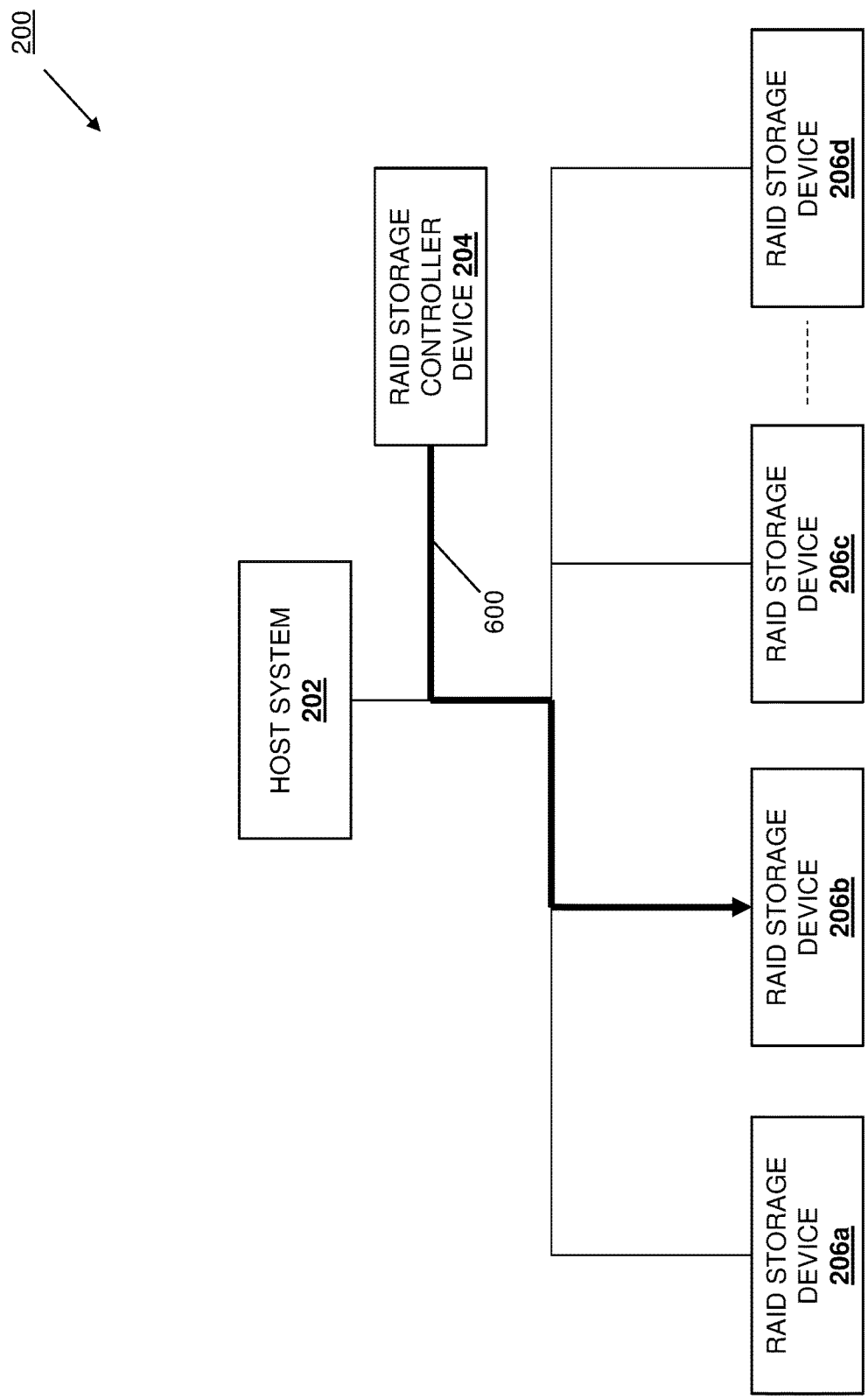
FIG. 6 is a schematic view illustrating an embodiment of the RAID storage system of FIG. 2 operating during the method of FIG. 4.

With reference to FIG. 6, the RAID storage controller device 204 is illustrated transmitting a multi-operation command 600 to the RAID storage controller device 206b, which may be the multi-operation commands discussed above with the WRITE WITH BUFFER multi-operation command role, the WRITE WITH XOR multi-operation command role, the GENERATE Q multi-operation command role, or the DATA MANIPULATION multi-operation command role discussed above, as well as any of the multi-operation command roles that would be apparent to one of skill in the art in possession of the present disclosure. As such, while several specific multi-operation command roles are discussed herein in detail, one of skill in the art in possession of the present disclosure will recognize that the RAID storage controller device 204 may generate and transmit any of a variety of multi-operation commands while remaining within the scope of the present disclosure as well.

The method 400 then proceeds to block 404 where a RAID storage device receives the multi-operation command and identifies a plurality of operations associated with a multi-operation command role included in the multi-operation command. In an embodiment, during or prior to the method 400, the RAID storage devices 206a-206d may be provided with operational steps associated with each multi-operation command role that may be received during the method 400. For example, the RAID storage database 309 in each of the RAID storage devices 206a-206d/300 may be provided with operational steps for each multi-operation command role in the multi-operation command table 500. As such, the RAID storage database 309 in each of the RAID storage devices 206a-206d/300 may include the WRITE WITH BUFFER multi-operation command role associated with operational steps that include a first operational step that retrieves data from the first address (e.g., ADDR. 1) associated with the WRITE WITH BUFFER multi-operation command role, a second operational step that writes that data from the first address (e.g., ADDR. 1) to the second address (e.g., ADDR. 2) associated with the WRITE WITH BUFFER multi-operation command role (e.g., "ADDR. 1>ADDR. 2"), and a third operational step that writes the data from the first address (e.g., ADDR. 1) to the third address (e.g., ADDR. 3) associated with the WRITE WITH BUFFER multi-operation command role (e.g., "ADDR. 1>ADDR. 3").

Furthermore, the RAID storage database 309 in each of the RAID storage devices 206a-206d/300 may include the WRITE WITH XOR multi-operation command role associated with operational steps that include a first operational step that retrieves data from the first address (e.g., ADDR. 1) associated with the WRITE WITH XOR multi-operation command role, a second operational step that performs an XOR operation on the data from the first address (e.g., ADDR. 1) and data in the second address (e.g., ADDR. 2) associated with the WRITE WITH XOR multi-operation command role, a third operational step that writes the result of XOR operation to the third address (e.g., ADDR. 3) associated with the WRITE WITH XOR multi-operation command role (e.g., "XOR (ADDR. 1, ADDR. 2)>ADDR. 3"), and a fourth operational step that writes the data from the first address (e.g., ADDR. 1) to the second address (e.g., ADDR. 2) (e.g., "ADDR. 1>ADDR. 2"). In addition, the RAID storage database 309 in each of the RAID storage devices 206a-206d/300 may include instructions to repeat the XOR operation discussed above a number of times that is defined by the optional count parameter (e.g., using the length (e.g., #LBA) as the stride).

Further still, the RAID storage database 309 in each of the RAID storage devices 206a-206d/300 may include the GENERATE Q multi-operation command role associated with operational steps that include a first operational step that retrieves data from the first address (e.g., ADDR. 1)

associated with the GENERATE Q multi-operation command role, a second operational step that uses the parameter value (e.g., "MULTIPLICAND & POSITION") to perform a GF operation on the data from the first address (e.g., ADDR. 1) and data in the second address (e.g., ADDR. 2) associated with the GENERATE Q multi-operation command role, and a third operational step that writes the result of GF operation to the third address (e.g., ADDR. 3) associated with the GENERATE Q multi-operation command role (e.g., "GF (ADDR. 1, ADDR. 2)>ADDR. 3").

Further still, the RAID storage database 309 in each of the RAID storage devices 206a-206d/300 may include the DATA MANIPULATION multi-operation command role associated with operational steps that include a first operational step that retrieves data from the first address (e.g., ADDR. 1) associated with the DATA MANIPULATION multi-operation command role, a second operational step that uses the parameter value (e.g., "OPERATOR") to perform an operation on the data from the first address (e.g., ADDR. 1) and data in the second address (e.g., ADDR. 2) associated with the DATA MANIPULATION multi-operation command role, and a third operational step that writes the result of operation to the third address (e.g., ADDR. 3) associated with the DATA MANIPULATION multi-operation command role (e.g., ("ADDR. 1 (OPERATOR) ADDR. 2)>ADDR. 3").

Thus, in an embodiment and at block 404, the RAID storage engine 304 in the RAID storage device 206b may receive the multi-operation command 600 from the RAID storage controller device 204 via its communication system 310 and, in response, may determine the multi-operation command role included in the multi-operation command 600, and identify the operational steps that are associated with that multi-operation command 600 in its RAID storage database 309 (detailed above.) As such, if the multi-operation command 600 includes the WRITE WITH BUFFER multi-operation command role, the RAID storage engine 304 may identify the first operational step to retrieve data from the first address associated with the WRITE WITH BUFFER multi-operation command role, the second operational step that writes that data from the first address to the second address associated with the WRITE WITH BUFFER multi-operation command role, and the third operational step that writes the data from the first address to the third address associated with the WRITE WITH BUFFER multi-operation command role.

Similarly, if the multi-operation command 600 includes the WRITE WITH XOR multi-operation command role, the RAID storage engine 304 may identify the first operational step that retrieves data from the first address associated with the WRITE WITH XOR multi-operation command role, the second operational step that performs an XOR operation on the data from the first address and data in the second address associated with the WRITE WITH XOR multi-operation command role, the third operational step that writes the result of XOR operation to the third address associated with the WRITE WITH XOR multi-operation command role, and the fourth operational step that writes the data from the first address to the second address.

Similarly, if the multi-operation command 600 includes the GENERATE Q multi-operation command role, the RAID storage engine storage engine 304 may identify the first operational step that retrieves data from the first address associated with the GENERATE Q multi-operation command role, the second operational step that uses the parameter value to perform a GF operation on the data from the first address and data in the second address associated with the GENERATE Q multi-operation command role, and the third operational step that writes the result of GF operation to the third address associated with the GENERATE Q multi-operation command role.

Similarly, if the multi-operation command 600 includes the DATA MANIPULATION multi-operation command role, the RAID storage engine storage engine 304 may identify the first operational step that retrieves data from the first address associated with the DATA MANIPULATION multi-operation command role, the second operational step that uses the parameter value to perform an operation on the data from the first address and data in the second address associated with the DATA MANIPULATION multi-operation command role, and the third operational step that writes the result of the operation to the third address associated with the DATA MANIPULATION multi-operation command role.

The method 400 then proceeds to optional block 406 where the RAID storage device may identify an operation parameter included in the multi-operation command. As discussed above, some multi-operation command roles may include an operation parameter that may be utilized in operation(s) that are part of the multi-operation command and, as such, in some embodiments the RAID storage engine 304 in the RAID storage device 206b may identify an operational parameter in the multi-operation command 600. For example, at block 406, the RAID storage engine 304 in the RAID storage device 206b may identify the "COUNT" operational parameter in the multi-operation command 600 that includes the WRITE WITH XOR multi-operation command role. Similarly, at block 406, the RAID storage engine 304 in the RAID storage device 206b may identify the "MULTIPLICAND & POSITION" operational parameter in the multi-operation command 600 that includes the GENERATE Q multi-operation command role. Similarly, at block 406, the RAID storage engine 304 in the RAID storage device 206b may identify the "OPERATOR" operational parameter in the multi-operation command 600 that includes the DATA MANIPULATION multi-operation command role.

The method 400 then proceeds to block 408 where the RAID storage device performs the plurality of operations using a plurality of addresses included in the multi-operation command. In an embodiment, at block 408, the RAID storage engine 304 in the RAID storage device 206b may operate to perform the multiple operational steps associated with the multi-operation command role that was identified in the multi-operation command 600 using the addresses that were included in that multi-operation command. For example, with reference to the multi-operation command 600 that identified the WRITE WITH BUFFER multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step identified at block 404 to retrieve data from the first physical source address (e.g., ADDR. 1/PHY. MEMORY (SOURCE)) in the host system 202, then may perform the second operational step identified at block 404 to write the data retrieved from that first physical source address to the second logical destination address (e.g., ADDR. 2/LOG. MEMORY (DESTINATION)) in the storage subsystem 306 of the RAID storage device 206b (e.g., "ADDR. 1>ADDR. 2"), and then may perform the third operational step identified at block 404 to write the data retrieved from the first physical source address to the third physical destination address (e.g., ADDR. 3) in the buffer subsystem 308 of the RAID storage device 206b (e.g., "ADDR. 1>ADDR. 3"). As will be appreciated by one of skill in the art in possession of the present disclosure, the retrieval of the data from the first physical source address in the host system 202 and the writing of that data to the second logical destination address and the third physical destination address in the RAID storage device 206b may be performed using Direct Memory Access (DMA) operations performed by the RAID storage engine 304.

Similarly, with reference to the multi-operation command 600 that identified the WRITE WITH XOR multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step identified at block 404 to retrieve data from the first physical source address (e.g., ADDR. 1/PHY. MEMORY (SOURCE)) in the host system 202, then may perform the second operational step that includes an XOR operation on the data retrieved from that first physical source address and data in the second logical source address (e.g., ADDR. 2/LOG. MEMORY (SOURCE)) in the storage subsystem 306 of the RAID storage device 206b, then perform the third operational step to write the result of XOR operation to the third physical destination address (e.g., ADDR. 3/PHY. MEMORY (DESTINATION)) in the storage subsystem 206 of the RAID storage device 206b (e.g., "XOR (ADDR. 1, ADDR. 2)>ADDR. 3"), and then perform the fourth operational step to write the data from the first physical source address (e.g., ADDR. 1/PHY. MEMORY (SOURCE)) to the second logical destination address (e.g., ADDR. 2/LOG. MEMORY (SOURCE)) (e.g., "ADDR. 1>ADDR. 2"). In addition, as discussed above, the RAID storage engine 304 may access the RAID storage database 309 to determine whether instructions to repeat the XOR operation discussed above a number of times are defined by the optional count parameter (e.g., using the length (e.g., #LBA) as the stride). As will be appreciated by one of skill in the art in possession of the present disclosure, the retrieval of the data from the first physical source address in the host system 202 and the writing of that data to the second logical destination address in the RAID storage device 206b may be performed using Direct Memory Access (DMA) operations performed by the RAID storage engine 304.

Similarly, with reference to the multi-operation command 600 that identified the GENERATE Q multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step to retrieve data from the first physical source address (e.g., ADDR. 1/PHY. MEMORY (SOURCE)) in the host system 202, the perform the second operational step that uses the parameter value (e.g., "MULTIPLICAND & POSITION") to perform a GF operation on the data from that first physical source address and data in the second physical source address (e.g., ADDR. 2/PHY. MEMORY (SOURCE)) in the storage subsystem 306 in the RAID storage device 206b, and then perform the third operational step to write the result of GF operation to the third logical destination address (e.g., ADDR. 3/LOG. MEMORY (DESTINATION) in the storage subsystem 306 of the RAID storage subsystem 206b (e.g., "GF (ADDR. 1, ADDR. 2)>ADDR. 3"). As will be appreciated by one of skill in the art in possession of the present disclosure, the retrieval of the data from the first physical source address in the host system 202 may be performed using Direct Memory Access (DMA) operations performed by the RAID storage engine 304.

Similarly, with reference to the multi-operation command 600 that identified the DATA MANIPULATION multi-operation command role discussed above, at block 408 the RAID storage engine 304 in the RAID storage device 206b may perform the multiple operational steps identified at block 404 using the plurality of addresses included in the multi-operation command 600. As such, the RAID storage engine 304 in the RAID storage device 206b may perform the first operational step to retrieve data from the first physical or logical source address (e.g., ADDR. 1/PHY. MEMORY/LOG. MEMORY (SOURCE)) in the host system 202, then perform the second operational step that uses the parameter value (e.g., "OPERATOR") to perform an operation on the data from that first physical or logical source address and data in the second physical or logical source address (e.g., ADDR. 2/PHY. MEMORY/LOG. MEMORY (SOURCE)) in the storage subsystem 306 of the RAID storage subsystem 206b, and then perform the third operational step to write the result of operation to the third physical or logical destination address (e.g., ADDR. 3/PHY. MEMORY/LOG. MEMORY (DESTINATION)) in the storage subsystem 306 of the RAID storage device 206b (e.g., "ADDR. 1 (OPERATOR) ADDR. 2)>ADDR. 3"). As will be appreciated by one of skill in the art in possession of the present disclosure, the retrieval of the data from the first physical or logical source address in the host system 202 may be performed using Direct Memory Access (DMA) operations performed by the RAID storage engine 304.

As such, multi-operation commands are enabled that may be generated and transmitted as a single command from the RAID storage controller device 204 to any RAID storage device, and that provides for the performance of multiple operations by the RAID storage engine 304 in that RAID storage device. As such, the number of commands generated and transmitted by the RAID storage controller device may be reduced. FIGS. 7A, 7B, and 7C illustrate multi-operation command tables 700A, 700B, and 700C that include a variety of examples of other multi-operation commands that may be implemented in the RAID storage system 200 in a manner similar to that described above. For example, the multi-operation command table 700A includes a write command role; a RAID 1 write command role that provides an example of step one of a RAID 1 write with no strict ordering of steps; a RAID 5 parity write command role that provides a full stripe write parity final step and a rebuild step; a RAID 5 parity partial write 1 & 2 command role that provides partial stripe write parity final steps; a RAID 5 compute command role that provides partial stripe write and full stripe write interim parity calculations, a rebuild interim parity calculation, and a missing memory (or missing drive) read interim and final calculation; a RAID 5 recovery interim command role; and a RAID 5 data partial write command role.

Similarly, the multi-operation command table 700B includes a RAID 6 update command role; RAID 6 compute 1 and 2 command roles; RAID 6 recovery 1 and 2 command roles; and a RAID 6 tables generation command role that provides for the generation of n-length gflog and gfilog tables (which may be stored internally in the RAID storage device.) Similarly, the multi-operation command table 700C includes a read command role; copy command role that may provide for the generation of data transfers for interim parity calculations; an acquire lock command role that provides for the acquiring of a lock on an LBA range for writes, and that lock may be held until the lock is released or the device is reset (fundamental, secondary, etc.), i.e., if there are any writes pending to the identified memory region (or identified logical block), the RAID storage engine will wait till they are complete and then acquire the lock and return status; a release lock command role that provides for the release of a lock region; and an acquire lock and read command role that provides for reads only after the successful locking of a lock region. One of skill in the art in possession of the present disclosure will recognize how the multi-operation commands in the multi-operation command tables 700A, 700B, and 700C may be implemented in a manner similar to those in the multi-operation command table 500 discussed above, and that any of a variety of multi-operation commands may be defined in a similar manner while remaining within the scope of the present disclosure as well.

Figure 8:
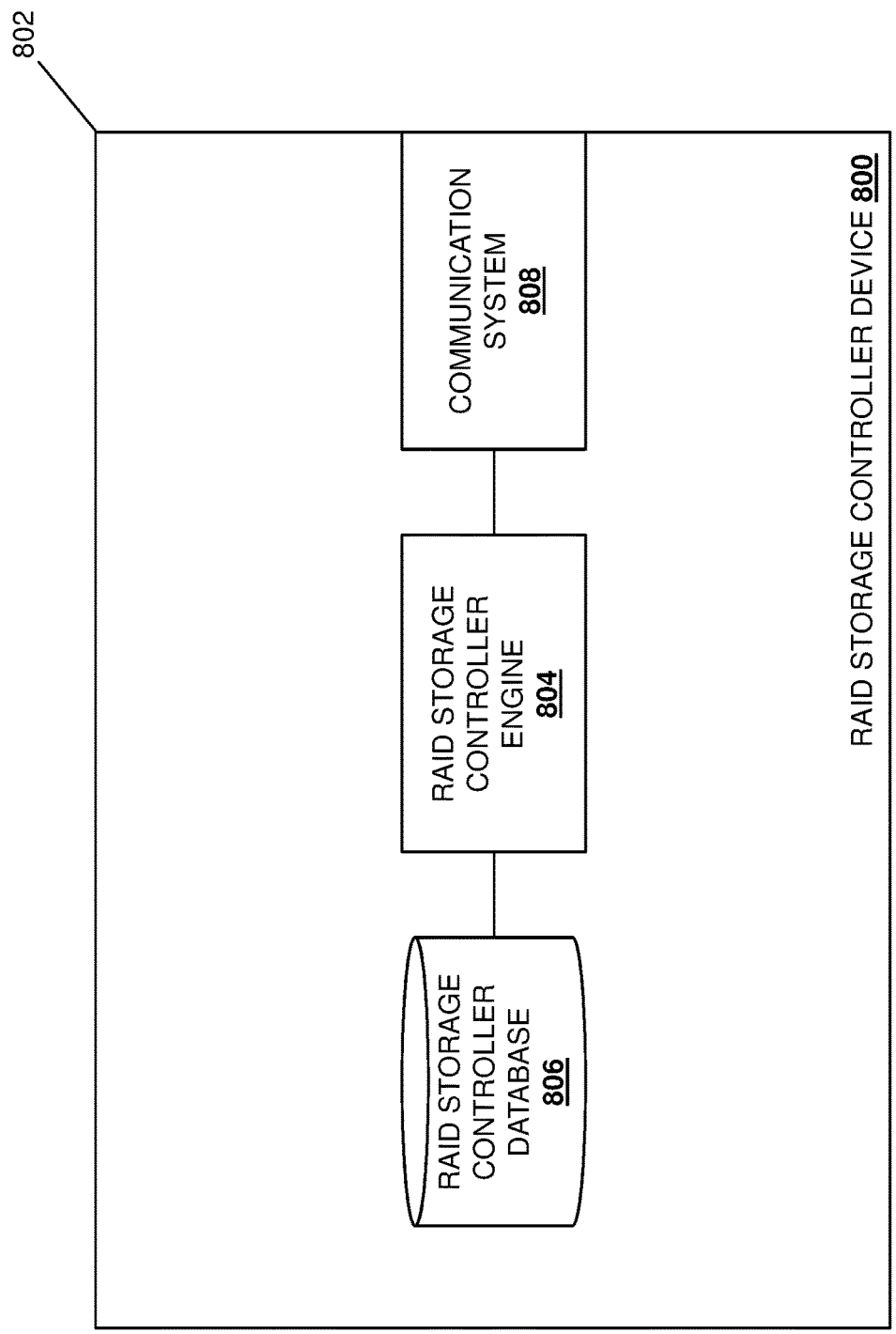
FIG. 8 is a schematic view illustrating an embodiment of a RAID storage controller device provided in the RAID storage system of FIG. 2.

Thus, systems and methods have been described that provide for the generation and transmission of multi-operation commands by a RAID storage controller device to a RAID storage device, with the RAID storage device that receives that multi-operation command performing multiple operations using a plurality of addresses identified in the multi-operation command. For example, the multi-operation command may identify a multi-operation command role and the plurality of addresses, and the RAID storage device receiving that multi-operation command may identify a plurality of operations associated the multi-operation command role in a database. The RAID storage device may then perform the plurality of operations using the plurality of addresses and, in some embodiments, may include the use of an operational parameter included in the multi-operation command. As such, RAID storage controller devices may send a single command that is configured to cause a RAID storage device to perform multiple operations, rather than sending a respective command for each of those operations, thus increasing the ability of the RAID storage controller device to scale with high performance RAID storage devices Referring now to FIG. 8, an embodiment of a RAID storage controller device 800 is illustrated that may provide the RAID storage controller device 204 discussed above with reference to FIG. 2. As such, the RAID storage controller device 800 may be provided by the IHS 100 discussed above with reference to FIG. 1 and/or may include some or all of the components of the IHS 100. Furthermore, while illustrated and discussed as a RAID storage controller device 800, one of skill in the art in possession of the present disclosure will recognize that the functionality of the RAID storage controller device 800 discussed below may be provided by other devices that are configured to operate similarly as discussed below. In the illustrated embodiment, the RAID storage controller device 800 includes a chassis 302 that houses the components of the RAID storage controller device 800, only some of which are illustrated below. For example, the chassis 802 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a RAID storage controller engine 804 that is configured to perform the functionality of the RAID storage controller engines and/or RAID storage controller devices discussed below.

The chassis 802 may also house a storage system (not illustrated, but which may include the storage 108 discussed above with reference to FIG. 1) that is coupled to the RAID storage controller engine 804 (e.g., via a coupling between the storage system and the processing system) and that includes a RAID storage controller database 806 that is configured to store any of the information utilized by the RAID storage controller engine 804 discussed below. The chassis 802 may also house a communication system 808 that is coupled to the RAID storage controller engine 804 (e.g., via a coupling between the communication system 808 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

While a specific RAID storage controller device 800 has been illustrated, one of skill in the art in possession of the present disclosure will recognize that RAID storage controller devices (or other devices operating according to the teachings of the present disclosure in a manner similar to that described below for the RAID storage controller device 800) may include a variety of components and/or component configurations for providing conventional RAID storage controller device functionality, as well as the functionality discussed below, while remaining within the scope of the present disclosure as well. For example, while the RAID storage controller device 800 has been described as a hardware RAID storage controller device provided in a chassis, in other embodiments the RAID storage controller device may be a software RAID storage controller device provided by software (e.g., instructions stored on a memory system) in the host system 202 that is executed by a processing system in the host system 202 while remaining within the scope of the present disclosure as well. As such, in some embodiments, the operations of the RAID storage controller device 800 discussed below may be performed via the processing system in the host system 202.

Figure 9:
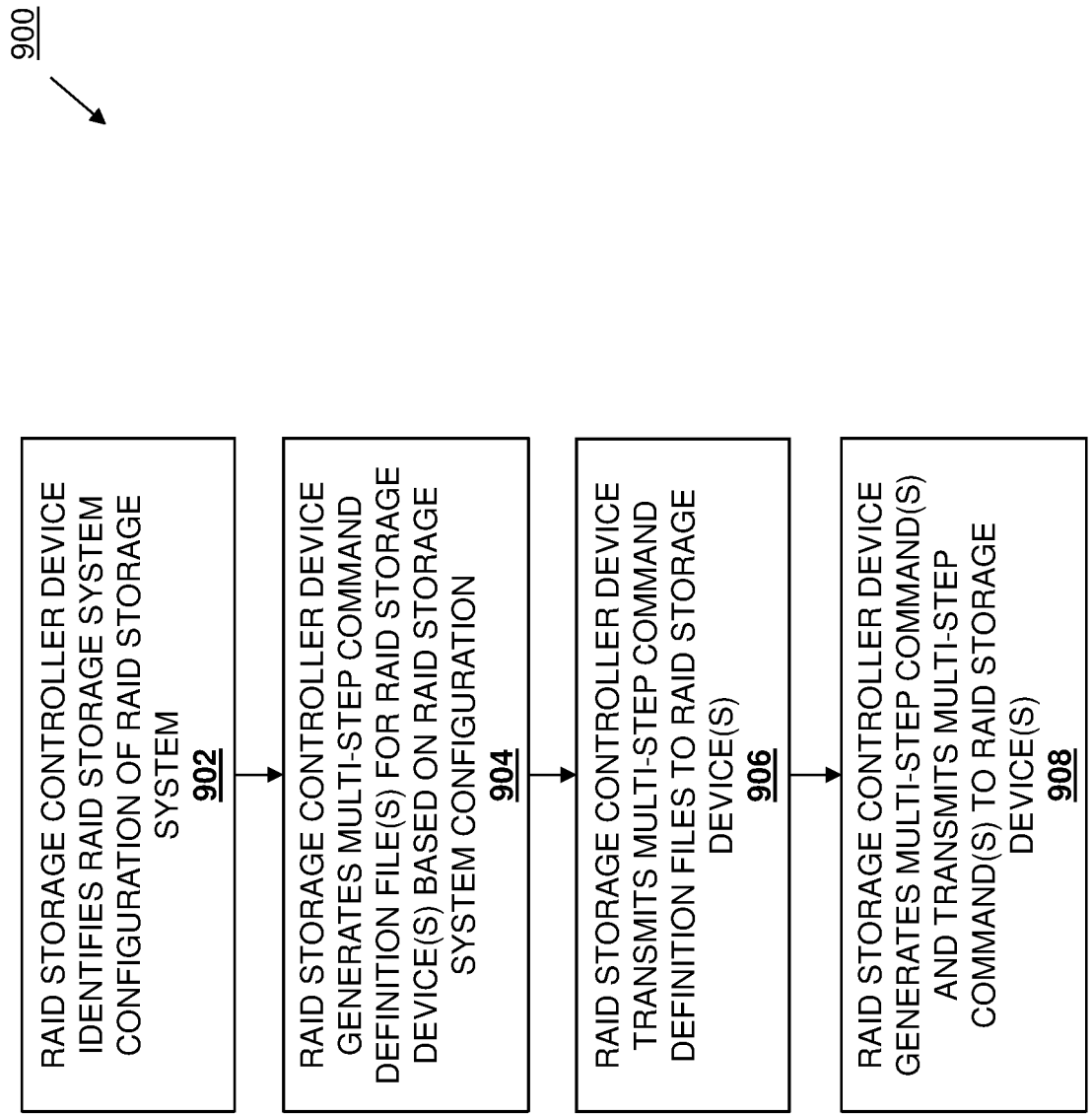
FIG. 9 is a flow chart illustrating an embodiment of a method for providing multi-step commands in a RAID storage system.

Referring now to FIG. 9, an embodiment of a method 900 for providing multi-step commands in a RAID storage system is illustrated. As discussed below, the systems and methods of the present disclosure provides flexible technique for allowing a RAID storage controller device to send a single, multi-step command to a RAID storage device that expresses multiple steps of operations that the RAID storage device should perform, thus offloading control processing and control communication transmissions from the RAID storage controller device. For example, a RAID storage controller device coupled to a RAID storage system may identify a RAID storage system configuration of the RAID storage system and, based on that RAID storage system configuration, and generate a first multi-step command definition file for a first RAID storage device that is included in the RAID storage system. The first multi-step command definition file defines a plurality of first steps that each include at least one first operation, and may be "tuned" to the first RAID storage device based on first RAID storage device configuration, the first RAID storage device capabilities, the operations that the first RAID storage device is expected to perform, the RAID storage controller device capabilities, and/or any other information that may be determined from the RAID storage system configuration.

As such, while RAID data storage devices within a RAID data storage system/RAIDset are often homogeneous, different types of RAID data storage devices may be provided in a RAID data storage system and coupled to its RAID storage controller device, and the first multi-step command definition file may be different than second multi-step definition file(s) provided to second RAID storage device(s) included in the RAID storage system. The RAID storage controller device may transmit the first multi-step command definition file to the first RAID storage device and, subsequent to transmitting the first multi-step command definition file, the RAID storage controller device may generate a first multi-step command that references the first multi-step command definition file and includes at least one first parameter for use in performing one or more first operations included in the plurality of first steps defined by the first multi-step command definition file. The RAID storage controller device may then transmit the first multi-step command to the first RAID storage device, which causes the first RAID storage device to carry out the first multi-step command based on the multi-step command definition file and using the at least one first parameter. As such, RAID storage controller devices may send a single command that is configured to cause a RAID storage device to perform multiple steps, each with one or more operation, rather than sending a respective command for each of those operations, thus increasing the ability of the RAID storage controller device to scale with high performance RAID storage devices, offloading control operations from the RAID storage controller device, and/or reducing the number of completion communications generated and transmitted by the RAID storage controller device (thus reducing its processing and data transmission overhead).

As will be appreciated by one of skill in the art in possession of the present disclosure, the multi-operation commands discussed above provide a framework that allows for the identification and instruction of the performance of particular operations associated with a particular roles (e.g., which may be identified using corresponding opcodes), but may be considered "single-step" commands in contrast to the multi-step commands described in further detail below that allow a single command to identify and instruct the performance of multiple steps (e.g., a plurality of the multi-operation commands discussed above.) Furthermore, the multi-operation commands discussed above may be considered "hard-coded" in that they allow a single command to perform multiple operations (e.g., using a respective opcode for each of those operations) one at a time, while the multi-step commands discussed below may be considered "soft-coded" in that they may cause a target device to perform multiple steps (each with one or more operations) in different orders depending on, for example, the configuration or role of the RAID storage device that is executing them.

The method 900 begins at block 902 where a RAID storage controller device identifies a RAID storage system configuration of a RAID storage system. In an embodiment, at block 902, the RAID storage controller engine 804 in the RAID storage controller device 204/800 may perform a variety of configuration determination operations in order to identify a RAID storage system configuration of the RAID storage system 200 that may include any detail about the components of the RAID storage system 200 (e.g., details about the host system 202, the RAID storage controller device 204, and/or the RAID storage devices 206a-206d in FIG. 2), details about the configuration or layout of the RAID storage system 200, and/or any other RAID storage system details that would be apparent to one of skill in the art in possession of the present disclosure.

Figure 10A:
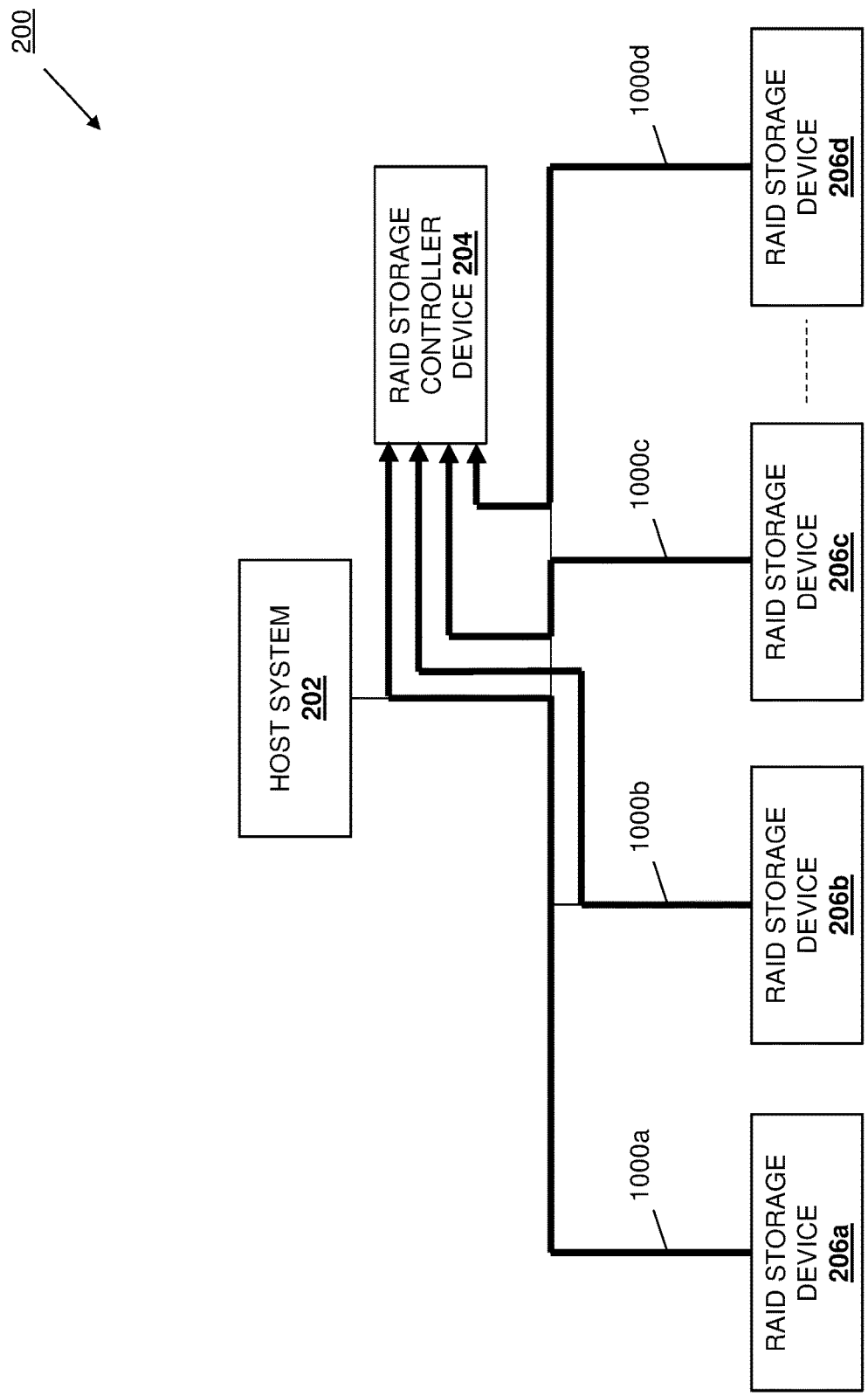
FIG. 10A is a schematic view illustrating an embodiment of the RAID storage system of FIG. 2 operating during the method of FIG. 9.

For example, FIG. 10A illustrates how the RAID storage controller engine 804 in the RAID storage controller device 204 may perform RAID storage device configuration retrieval operations 1000a, 1000b, 1000c, and 1000d in order to retrieve respective RAID storage device configurations from each of the RAID storage devices 206a, 206b, 206c, and 206d, respectively. As will be appreciated by one of skill in the art in possession of the present disclosure, the RAID storage device configurations from each of the RAID storage devices 206a, 206b, 206c, and 206d may identify how the RAID storage devices 206a-206d are configured to operate, the capabilities (e.g., processing capabilities, memory capabilities, etc.) of the RAID storage devices 206a-206d, the operations that the RAID storage devices 206a-206d will perform during RAID storage activities, and/or any other information about the RAID storage devices 206a-206d that would be apparent to one of skill in the art in possession of the present disclosure.

Furthermore, while not illustrated, the RAID storage controller engine 804 in the RAID storage controller device 204/800 may perform host system configuration retrieval operations (similar to the RAID storage device configuration retrieval operations 1000a-1000d) in order to retrieve a host system configuration from the host system 202. As will be appreciated by one of skill in the art in possession of the present disclosure, the host system configuration from the host system 202 may identify how the host system 202 is configured to operate, the capabilities of the host system 202, the operations that the host system 202 will perform during RAID storage activities, and/or any other information about the host system 202 that would be apparent to one of skill in the art in possession of the present disclosure. Further still, the RAID storage controller engine 804 in the RAID storage controller device 204/800 may perform RAID storage controller system configuration determination operations in order to determine a RAID storage controller device configuration of the RAID storage controller device 204. As will be appreciated by one of skill in the art in possession of the present disclosure, the RAID storage controller device configuration may identify how the RAID storage controller device 204 is configured to operate, the capabilities of the RAID storage controller device 204, the operations that the RAID storage controller device 204 will perform during RAID storage activities, and/or any other information about the RAID storage controller device 204 that would be apparent to one of skill in the art in possession of the present disclosure.

While a few specific examples of configuration retrieval and determination operations have been described that provide for the retrieval of configurations from each of the components in the RAID storage system 200, one of skill in the art in possession of the present disclosure will appreciate that any information about the RAID storage system 200 that is accessible to the RAID storage controller device 204/800 may be retrieved, determined, and/or otherwise identified by the RAID storage controller engine 804 at block 402 while remaining within the scope of the present disclosure. For example, RAID storage system configuration information may be provided by an administrator or other user of the RAID storage system 200 (e.g., in the RAID storage controller database 306) to the RAID storage controller engine 804 in the RAID storage controller device 204/800 in order to inform the RAID storage controller device 204 about any RAID storage system detail. Thus, in an embodiment of block 402, the RAID storage controller engine 804 in the RAID storage controller device 204/800 may utilize any of the configurations and/or other information retrieved at block 402 in order to identify a RAID storage system configuration of the RAID storage system 200.

With reference to some of the specific examples provided below, the identification of the RAID storage system configuration at block 402 may include the identification of the capabilities of any of the RAID storage devices 206a-206d to which multi-step commands will be provided during the method 400, which may include the processing capabilities (e.g., read capabilities, write capabilities, XOR operation capabilities, GF operation capabilities, and/or any other processing capabilities known in the art) of that RAID storage device, the memory capabilities (e.g., buffer storage capabilities, CMB storage capabilities, RAID storage capabilities, and/or any other memory capabilities known in the art) of that RAID storage device, and/or any other capabilities of that RAID storage device that would be apparent to one of skill in the art in possession of the present disclosure. In particular, one of skill in the art in possession of the present disclosure will appreciate that the capabilities identified for any particular RAID storage device 206a-206d may be different than the capabilities identified for any of the other RAID storage devices 206a-206d.

Furthermore, the identification of the RAID storage system configuration at block 402 may include the identification of the configuration of any of the RAID storage devices 206a-206d to which multi-step commands will be provided during the method 400, which may include the RAID configuration details of that RAID storage device (e.g., RAID data storage configurations, RAID parity storage configuration, and/or any other RAID configuration details known in the art), RAID configuration positioning information of that RAID storage device (e.g., RAID storage device positioning that may affect whether data or parity is stored for any particular data strip, as well as any other RAID configuration positioning information known in the art), and/or any other configuration information about that RAID storage device that would be apparent to one of skill in the art in possession of the present disclosure. In particular, one of skill in the art in possession of the present disclosure will appreciate that the configuration identified for any particular RAID storage device 206a-206d may be different than the configuration identified for any of the other RAID storage devices 206a-206d.

Further still, the identification of the RAID storage system configuration at block 402 may include the identification of the operations that may be performed by any of the RAID storage devices 206a-206d to which multi-step commands will be provided during the method 400, which may include any of the RAID data storage operations (e.g., read operations, write operations, XOR operations, GF operations, etc.) that will be performed by that RAID storage device, which one of skill in the art in possession of the present disclosure will appreciate may be identified based on the configuration of that RAID storage device, RAID configuration positioning information for that RAID storage device, expected operations of the host system 202 and/or the RAID storage controller device 204, and/or using any other techniques that would be apparent to one of skill in the art in possession of the present disclosure. In particular, one of skill in the art in possession of the present disclosure will appreciate that the expected operations identified for any particular RAID storage device 206a-206d may be different than the capabilities identified for any of the other RAID storage devices 206a-206d.

However, while several examples have been provided, one of skill in the art in possession of the present disclosure will appreciate that the RAID storage system configuration utilized by the RAID storage controller engine 804 in the RAID storage controller device 204/800 to generate the multi-step command definition files below may include any information that one of skill in the art would recognize as enabling the functionality discussed below. For example, multi-step command definition files may be generated for RAID storage devices based on a RAID storage system layout, based on at least one capability of the RAID storage controller device 204, based on at least one RAID volume lifecycle event (e.g., an event that disturbs, modifies, or otherwise changes a state of the RAID volume including, for example, the storage device rebuild operations in response to storage device failures or unavailability discussed above, as well as RAID creation, RAID deletion, property changes on a RAID volume, and/or other events that would be apparent to one of skill in the art in possession of the present disclosure), and/or based on any other information that one of skill in the art in possession of the present disclosure would recognize as providing for the "tuning" of a multi-step command definition file based on the specific RAID storage device to which it will be provided.

Figure 10B:
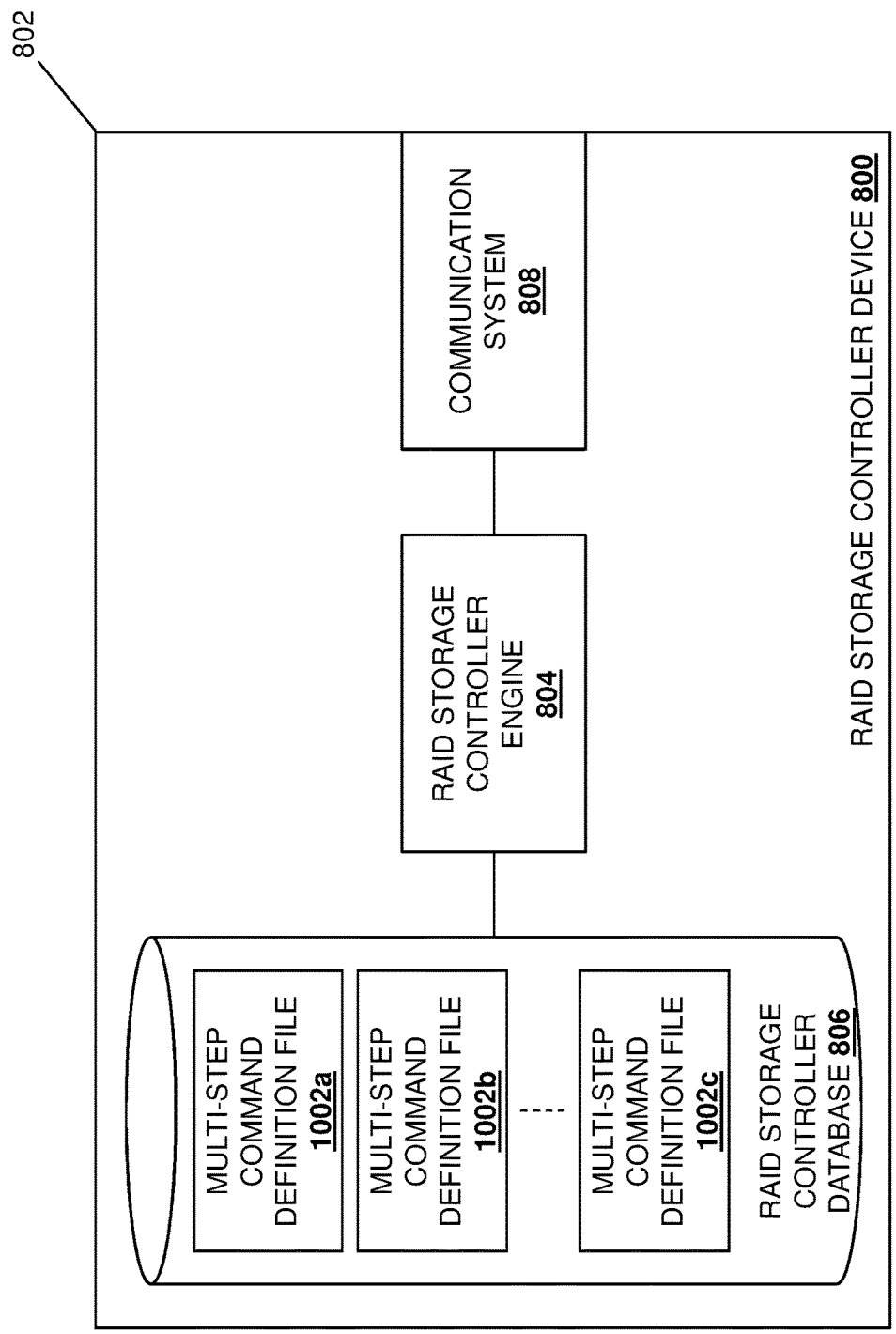
FIG. 10B is a schematic view illustrating an embodiment of the RAID storage controller device of FIG. 8 operating during the method of FIG. 9.

The method 900 then proceeds to block 904 where the RAID storage controller device generates multi-step command definition file(s) for RAID storage device(s) based on the RAID storage system configuration. In some embodiments, the generation of the multi-step command definition file(s) at block 904 (and in some cases the identification of the RAID storage system configuration at block 902) may be performed by the RAID storage controller engine 804 in the RAID storage controller device 204/800 during the initialization of the RAID storage system 200 and/or the RAID storage controller device 204, although the generation of multi-step command definition files at different times (e.g., during runtime) will fall within the scope of the present disclosure as well. As illustrated in FIG. 10B, in an embodiment of block 904, the RAID storage controller engine 804 in the RAID storage controller device 204/800 may operate to generate multi-step command definition files 1002a, 1002b, and up to 1002c. For example, the respective multi-step command definition files 1002a, 1002b, and up to 1002c may be generated by the RAID storage controller engine 804 in the RAID storage controller device 204/800 for respective RAID storage devices 206a-206d. However, while a respective multi-step command definition file is illustrated and discussed as being generated for each RAID storage device 206a-206d, one of skill in the art in possession of the present disclosure will recognize that respective multi-step command definition file(s) may be generated for a subset of the RAID storage devices 206a-206d while remaining within the scope of the present disclosure as well. For example, at block 904, multi-step command definition file(s) may be generated only for RAID storage devices that the RAID storage controller engine 804 in the RAID storage controller device 204/800 determines (e.g., based on the RAID storage system configuration) will operate during the method 400 in a manner that will benefit from receiving and executing multi-step commands.

In some embodiments, any multi-step command definition file generated for a particular RAID storage device may include a plurality of steps, with each step including at least one operation. For example, any of the plurality of steps included in a multi-step command definition file may include any of the multi-operation command roles discussed above that include multiple operational steps described above. Thus, with reference to FIG. 5, any of the plurality of steps includes in a multi-step command definition file may include any of the operational steps or operations provided by the WRITE WITH BUFFER multi-operation command role, the WRITE WITH XOR multi-operation command role, the GENERATE Q multi-operation command role, and/or the DATA MANIPULATION multi-operation command role.

Furthermore, with reference to FIGS. 7A, 7B, and 7C, any of the plurality of steps included in a multi-step command definition file may include any of the operational steps or operations provided by the WRITE multi-operation command role, the RAID 1 WRITE multi-operation command role, the RAID 5 PARITY WRITE multi-operation command role, the RAID 5 PARTIAL WRITE 1 multi-operation command role, the RAID 5 PARTIAL WRITE 2 multi-operation command role, the RAID 5 COMPUTE multi-operation command role, the RAID 5 RECOVERY INTERIM multi-operation command role, the RAID 5 DATA PARTIAL WRITE multi-operation command role, the RAID 6 UPDATE multi-operation command role, the RAID 6 COMPUTE 1 multi-operation command role, the RAID 6 COMPUTE 2 multi-operation command role, the RAID 6 RECOVERY 1 multi-operation command role, the RAID 6 RECOVERY 2 multi-operation command role, the RAID 6 TABLES GENERATION multi-operation command role, the READ multi-operation command role, the COPY multi-operation command role, the ACQUIRE LOCK multi-operation command role, the RELEASE LOCK multi-operation command role, and the ACQUIRE LOCK AND READ multi-operation command role.

Furthermore, while the plurality of steps that are included in the multi-step command definition file generated at block 904 have been described as including operations provided by the operational steps described for the multi-operation command roles discussed above, one of skill in the art in possession of the present disclosure will appreciate that the one or more operations included in any of the plurality of steps that are included in the multi-step command definition file may be conventional (single) operations while remaining within the scope of the present disclosure as well. To provide a specific, simplified example for the purposes of the discussion below, the multi-step command definition file may be generated at block 904 by the RAID storage controller engine 804 in the RAID storage controller device 204/800 for the RAID storage device 206b (based on the RAID storage system configuration as discussed above), and may provide a RAID 1 write with a Persistent Memory Region (PMR) completion acknowledgement.

As such, the multi-step command definition file may define a first step that includes first operations that provide for the reading of data from a first memory system address in a first memory system that is not included in the RAID storage device 206b and the storage of that data in a second memory system address in a second memory system that is included in the RAID storage device 206b (e.g., as per the READ multi-operation command role discussed above with reference to FIG. 7C), a second step that includes second operations that provides for the copying of the data from the second memory system that is included in the RAID storage device 206b to a third memory system address in a third memory system that is not included in the RAID storage device 206b (e.g., as per the COPY multi-operation command role discussed above with reference to FIG. 7C), and a third step that includes a third operation that transmits a completion status communication to the RAID storage controller device 204. However, while a very simple multi-step command definition file is provided for purposes of discussion below, one of skill in the art in possession of the present disclosure will appreciate that multi-step command definition files with many more steps having more operations may be generated at block 904 while remaining within the scope of the present disclosure as well.

Figure 10C:
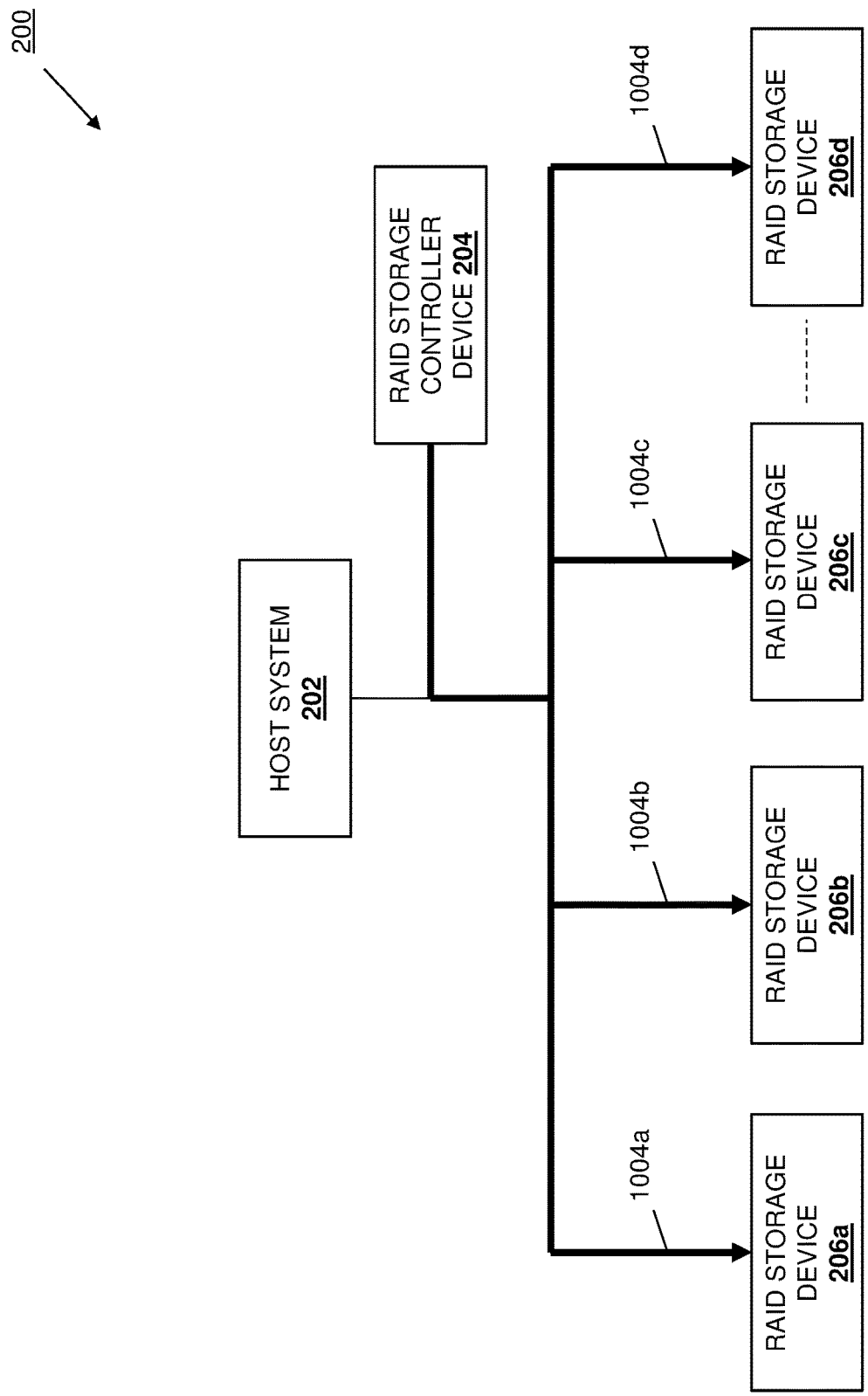
FIG. 10C is a schematic view illustrating an embodiment of the RAID storage system of FIG. 2 operating during the method of FIG. 9.

The method 900 then proceeds to block 906 where the RAID storage controller device transmits the multi-step command definition file(s) to the RAID storage device(s). As illustrated in FIG. 10C, in an embodiment of block 906, the RAID storage controller engine 804 in the RAID storage controller device 204/800 may operate to perform respective multi-step command definition file transmission operations 1004a, 1004b, 1004c, and 1004d in order to transmit any the multi-step command definition files that were generated at block 904 via its communication system 808 and to the respective RAID storage devices 206a-206d for which those multi-step command definition files were generated. However, while multi-step command definition files are illustrated as being provided to each of the RAID storage devices 206a-206d, as discussed above, multi-step command definition files may be provided to a subset of the RAID storage devices 206a-206d while remaining within the scope of the present disclosure as well. Continuing with the example provided above in which a multi-step command definition file was generated for the RAID storage device 206b to provide for RAID 1 writes with a PMR completion acknowledgement, at block 906, the RAID storage engine 304 in the RAID storage device 206b/300 may receive the multi-definition command file via its communication system 310 and, in response, store that multi-definition command file (e.g., in the RAID storage database 309, the storage subsystem 306, and/or any other memory/storage location accessible to the RAID storage engine 304.)

The method 900 then proceeds to block 908 where the RAID storage controller device generates multi-step command(s) and transmits the multi-step command(s) to the RAID storage device(s). In an embodiment, at block 908, the RAID storage controller engine 804 in the RAID storage controller device 204/800 may determine that a RAID storage device needs to perform a multi-step command and, in response, may generate a multi-step command. For example, the host system 202 may request an operation (e.g., a write operation in the example provided below) from the RAID storage controller device 204 and, in response, the RAID storage controller engine 804 in the RAID storage controller device 204/800 may determine that a RAID storage device needs to perform a multi-step command in response to that write operation. In an embodiment, the multi-step command generated at block 908 may reference the multi-step command definition file that was transmitted at block 904 to the RAID storage device that will be receiving the multi-step command, and may include parameter(s) for use in performing the operation(s) included in the step(s) defined by that multi-step command definition file.

Continuing with the example provided above, at block 908 the RAID storage controller engine 804 in the RAID storage controller device 204/800 may determine that the RAID storage device 206b should perform a RAID 1 write with a PMR completion acknowledgement that provides for the copying of data from the host system 202, the backing up of that data on the RAID storage device 206c, and the acknowledgement of that operation. As such, at block 908, the RAID storage controller engine 804 in the RAID storage controller device 204/800 may generate a multi-step command that may be associated with an opcode (e.g., during multi-step command submission, discussed in further detail blow) that references the multi-step command definition file that was transmitted to the RAID storage device 206b at block 904, and that multi-step command may include a first memory system address parameter that identifies the memory system address in the memory system of the host system 202 from which the data should be copied, a second memory system address parameter that identifies the memory system address in the memory system of the RAID storage device 206b in which the data should be stored, and a third memory system address parameter that identifies the memory system address in the memory system of the RAID storage device 206c to which the data should be backed up. However, while specific parameters in a specific multi-step command have been provided, one of skill in the art in possession of the present disclosure will appreciate that a variety of parameters may be provided in a multi-step command in order to provide for performing each operation included in the steps defined by the multi-step command definition file while remaining within the scope of the present disclosure.

Figure 11A:
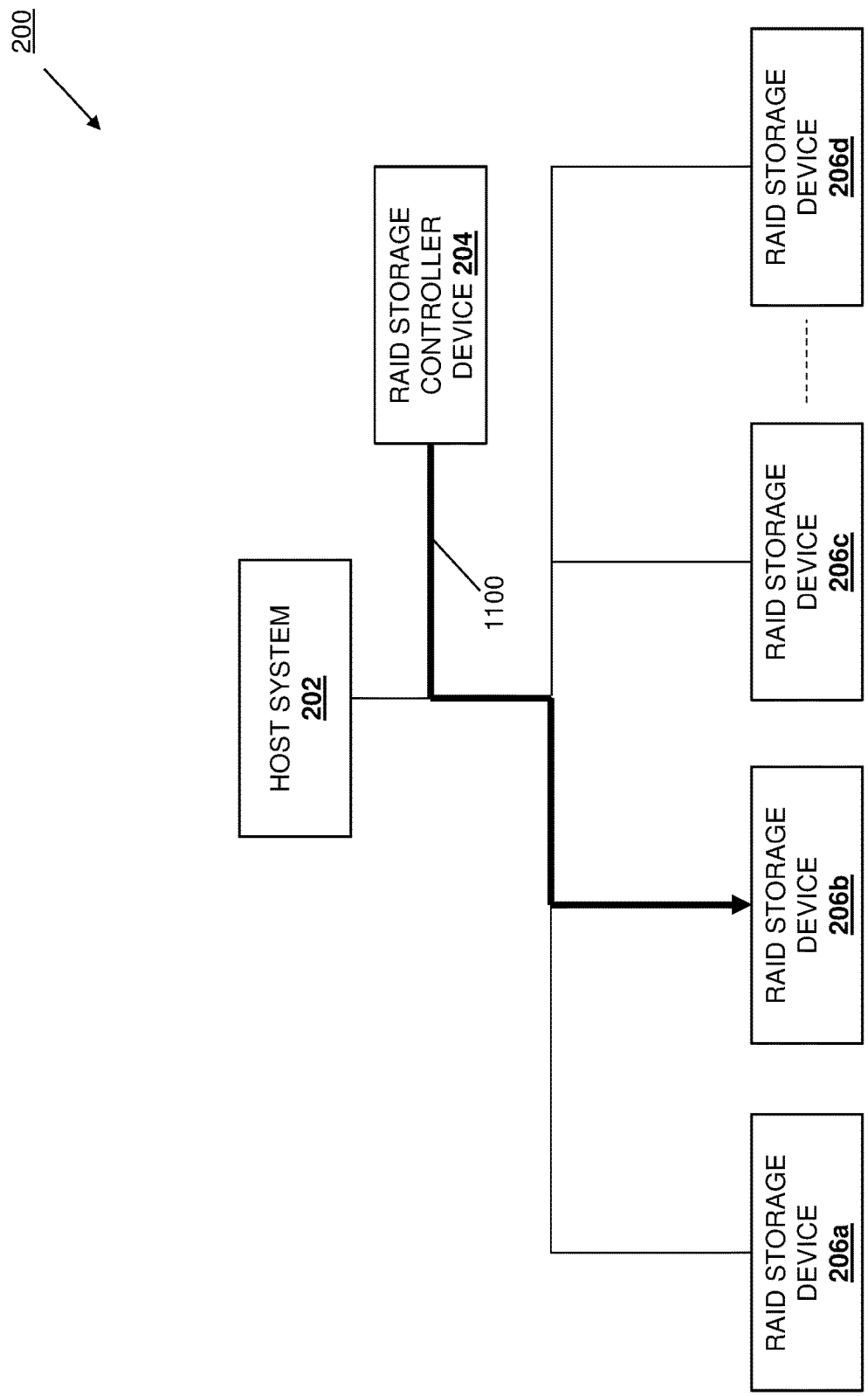
FIG. 11A is a schematic view illustrating an embodiment of the RAID storage system of FIG. 2 operating during the method of FIG. 9.

As illustrated in FIG. 11A, at block 908, the RAID storage controller engine 804 in the RAID storage controller device 204/800 may perform multi-step command transmission operations 1100 to transmit the multi-step command to the RAID storage device 206b via its communication system 808. For example, the RAID storage controller engine 804 in the RAID storage controller device 204/800 may generate the multi-step command, provide the multi-step command in a submission queue, and ring a doorbell for the RAID storage device 206b. As discussed above, the RAID storage controller engine 804 in the RAID storage controller device 204/800 may reference the multi-step command definition file for which the multi-step command should be used via the use of an opcode during the submission of the multi-step command to the submission queue. As such, at block 908, the RAID storage engine 304 in the RAID storage device 206b/300 may receive the multi-step command via its communication system 308 (e.g., via retrieval of the multi-step command from the submission queue discussed above.) As will be appreciated by one of skill in the art in possession of the present disclosure, in response to receiving the multi-step command at block 908, the RAID storage engine 304 in the RAID storage device 206b/300 may identify the multi-step command definition file received at block 904 and identified by the multi-step command, and may use the parameter(s) included in the multi-step command to perform the operation(s) included in the steps defined by the multi-step command definition file.

Figure 11B:
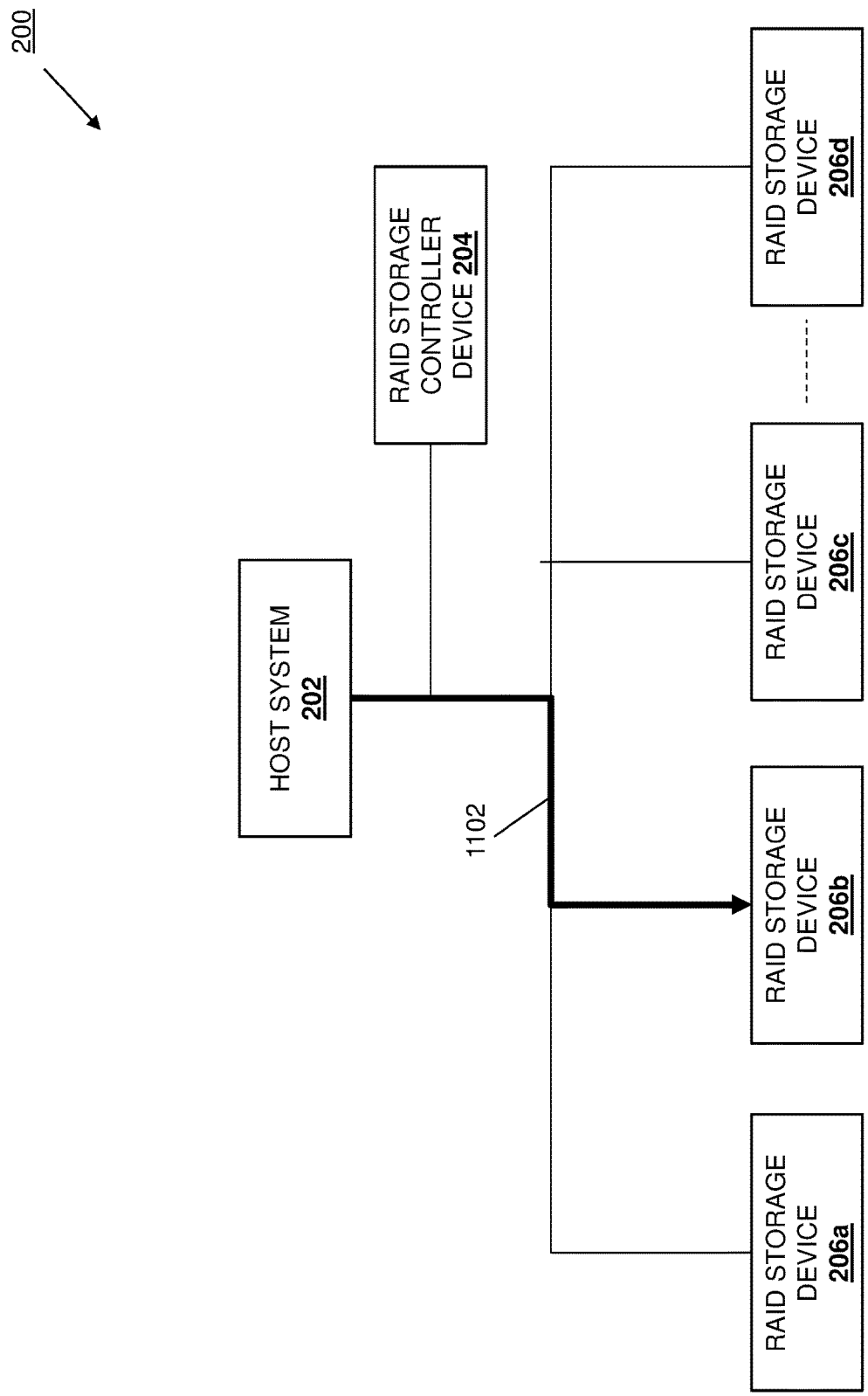
FIG. 11B is a schematic view illustrating an embodiment of the RAID storage system of FIG. 2 operating during the method of FIG. 9.
Figure 11C:
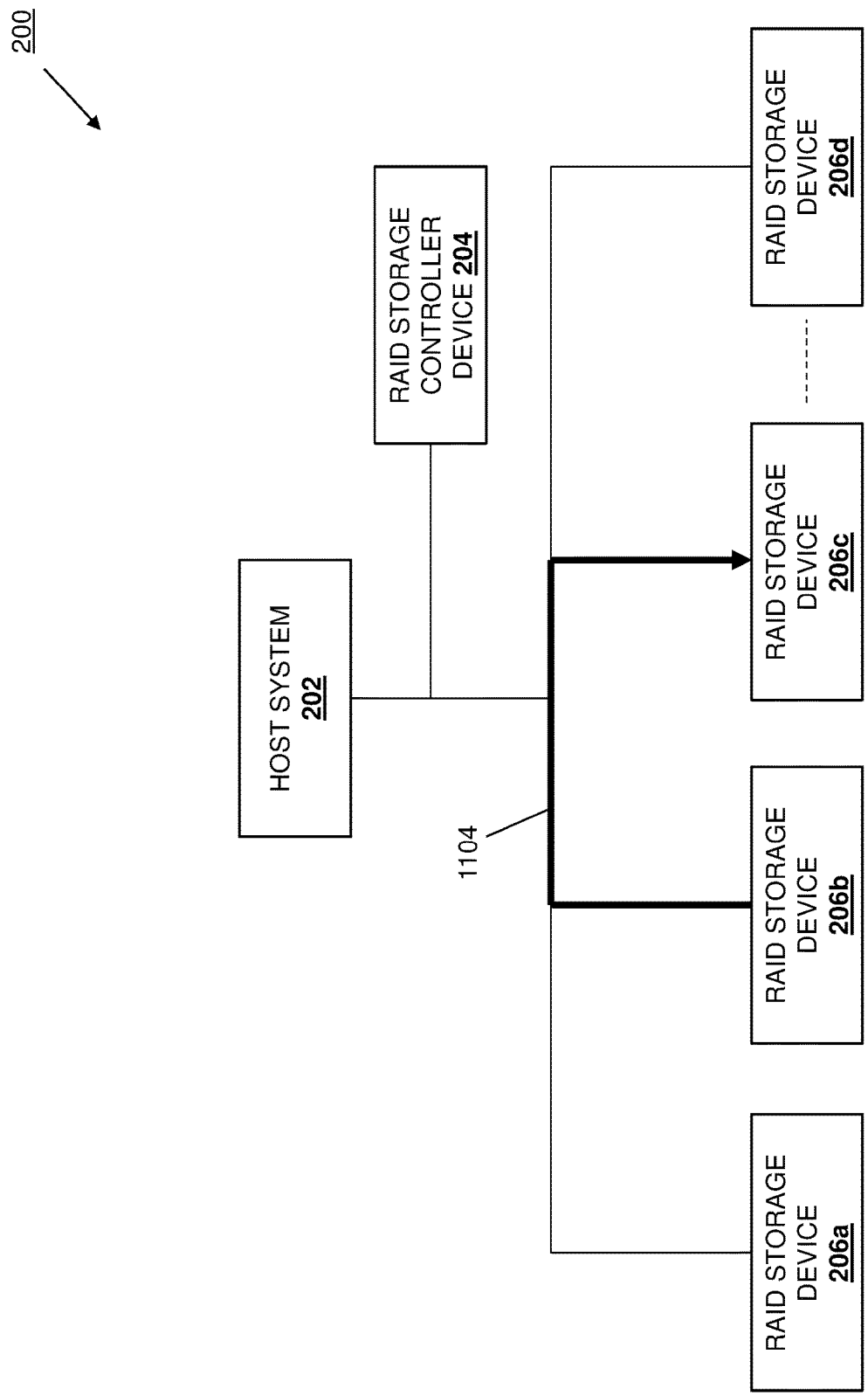
FIG. 11C is a schematic view illustrating an embodiment of the RAID storage system of FIG. 2 operating during the method of FIG. 9.

Continuing with the example provided above in which the multi-step command definition file provides for a RAID 1 write with a PMR completion acknowledgement by the RAID storage device 206b, the RAID storage engine 304 in the RAID storage device 206b/300 may identify the multi-step command definition file received at block 908 using the opcode that is associated with the multi-step command and that references that multi-step command definition file, and may use the parameters included in the multi-step command to perform the operations included in the steps defined by the multi-step command definition file. As such, the RAID storage engine 304 in the RAID storage device 206b/300 may perform a first operation that is part of a first step defined by the multi-step command definition file that includes a DMA operation 1102 that reads data from the memory system address in the memory system of the host system 202 that is identified by the first memory system address parameter included in the multi-step command, as illustrated in FIG. 11B, and may perform a second operation that is part of the first step defined by the multi-step command definition file to store that data in the memory system address in the memory system of the RAID storage device 206b that is identified by the second memory system address parameter included in the multi-step command.

Figure 11D:
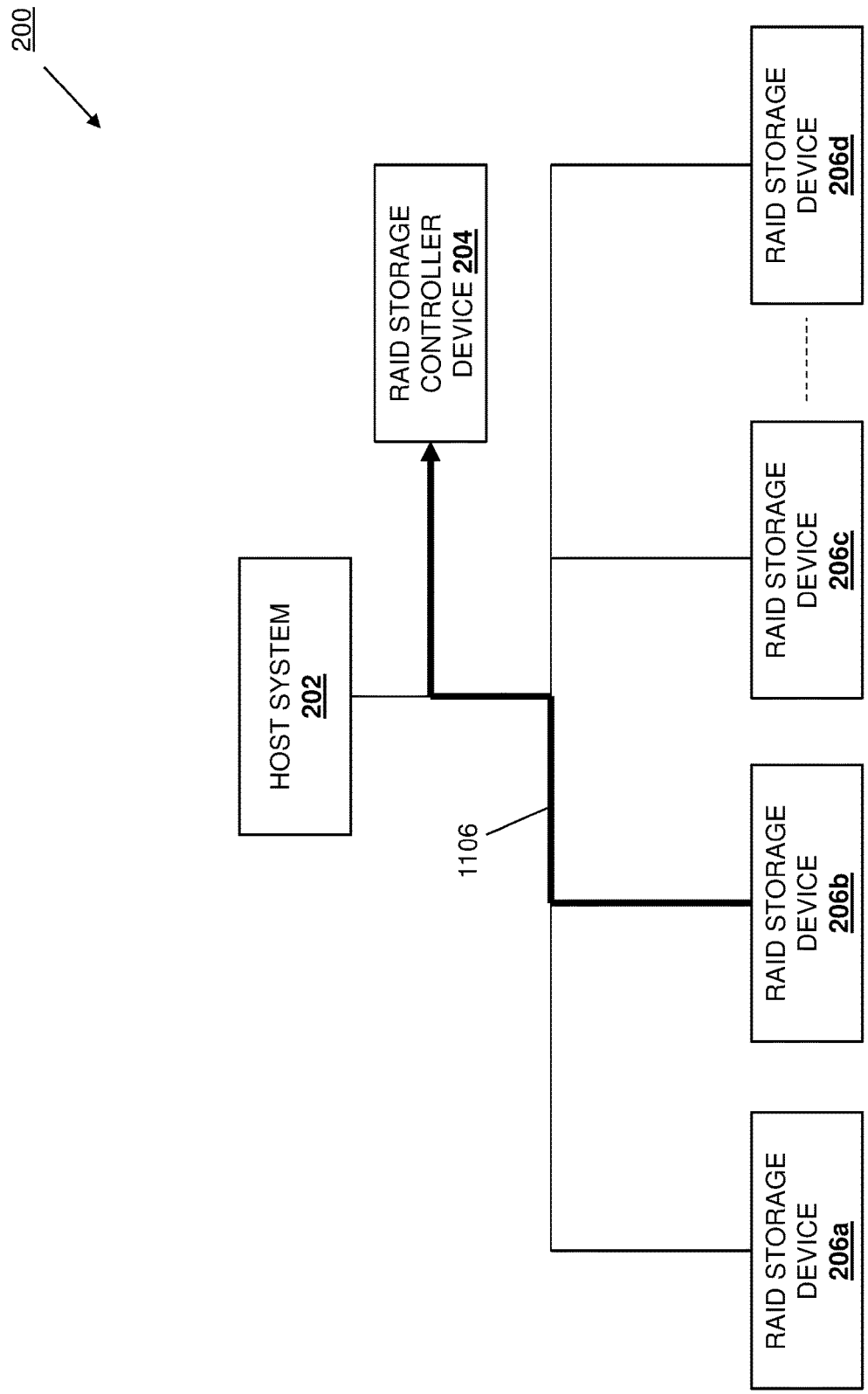
FIG. 11D is a schematic view illustrating an embodiment of the RAID storage system of FIG. 2 operating during the method of FIG. 9.

The RAID storage engine 304 in the RAID storage device 206b/300 may then perform a third operation that is part of a second step defined by the multi-step command definition file that includes a DMA operation 1104 that writes the data to the memory system address in the memory system of the RAID storage device 206c that is identified by the third memory system address parameter included in the multi-step command, as illustrated in FIG. 110. The RAID storage engine 304 in the RAID storage device 206b/300 may then perform a fourth operation that is part of a third step defined by the multi-step command definition file that includes a confirmation communication transmission operation 1106 that transmits a confirmation communication to the RAID storage controller device 204, as illustrated in FIG. 11D. As will be appreciated by one of skill in the art in possession of the present disclosure, the execution of operations by a RAID storage device in the manner described above may benefit from being uninterrupted, and the use of the multi-step commands discussed above allow for such uninterrupted operations. However, while the execution of a specific multi-step command has been described, one of skill in the art in possession of the present disclosure will appreciate that multi-step commands providing for any of a variety of operations in any number of steps will fall with the scope of the present disclosure as well.

As such, the RAID storage devices 206a-206d may operate to store and manage the multi-step command definition files received from the RAID storage controller device 204 so that it may execute multi-step commands that reference that multi-step command definition file. Furthermore, in some embodiments, the RAID storage controller device 204 may manage multi-step command definition files as well. For example, the RAID storage controller engine 804 in the RAID storage controller device 204/800 may monitor the operational lifecycle of the RAID volume in the RAID storage system 200 to detect changes (e.g., from an online RAID volume, to a degraded RAID volume, to a rebuild RAID volume, etc.), and may delete, modify, and/or create multi-step command definition files as needed. Thus, in some embodiment, the RAID storage controller engine 804 in the RAID storage controller device 204/800 may determine that the RAID storage system configuration of the RAID storage system 202 has changed and, in response, may generate a new multi-step command definition file for the RAID storage device 206b that defines a subset of the plurality of previous steps included in the previous multi-step command definition file, and at least one new step that includes at least one new operation. One of skill in the art in possession of the present disclosure will appreciate that the new multi-step command definition file may then be transmitted to the RAID storage device 206b in substantially the same manner as discussed above, and multi-step commands referencing that new multi-step command definition file will cause the RAID storage device 206b to perform the previous steps and new step(s) in substantially the same manners as discussed above.

Thus, systems and methods have been described that provide flexible techniques for allowing a RAID storage controller device to send a single, multi-step command to a RAID storage device that expresses multiple steps of operations that the RAID storage device should perform, thus relieving the RAID storage controller device of many command overhead operations. As will be appreciated by one of skill in the art in possession of the present disclosure, the multi-step command definition files described herein provide adaptive flexibility for specific RAID storage system layouts, RAID storage controller device capabilities, and RAID volume inflection points via the definition of multiple steps that may each include one or more operations (e.g., read operations, write operations, and basic data manipulation operations) that will be performed by a RAID storage device that receives a multi-step command that references that multi-step commend definition file. Furthermore, one of skill in the art in possession of the present disclosure will recognize that different RAID storage devices in the RAID storage system need not be aware of the same set of multi-step command definition files, as each multi-step definition files may be specific to, or "tuned", to one or more of the RAID storage devices. As such, the systems and methods provide flexibility in the performance of drive-assisted data storage operations such as, for example, the ability to dynamically select the implementation of "push" data storage operations (e.g., a DMA write operation by a first RAID storage device from a first memory location in the first RAID storage device to a second memory location in a second RAID storage device) or "pull" data storage operations (e.g., a DMA read operation by a first RAID storage device from a second memory location in a second RAID storage device to a first memory location in the first RAID storage device) during runtime of the RAID storage system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Redundant Array of Independent Disks (RAID) storage multi-step command system, comprising:
    a Redundant Array of Independent Disk (RAID) storage system that includes a plurality of RAID storage devices; and
    a Redundant Array of Independent Disk (RAID) storage controller device that is coupled to the RAID storage system and that is configured to:
        identify a RAID storage system configuration of the RAID storage system;
        generate, based on the RAID storage system configuration, a first multi-step command definition file for a first RAID storage device that is included in the plurality of RAID storage devices, wherein the first multi-step command definition file defines a plurality of first steps that each include at least one first operation;
        transmit the first multi-step command definition file to the first RAID storage device;
        generate, subsequent to transmitting the first multi-step command definition file, a first multi-step command that references the first multi-step command definition file and includes at least one first parameter for use in performing one or more first operations included in the plurality of first steps defined by the first multi-step command definition file; and
        transmit the first multi-step command to the first RAID storage device.

2. The system of claim 1, wherein the generating of the first multi-step command definition file for the first RAID storage device based on the RAID storage system configuration includes at least one of:
    generating the first multi-step command definition file for the first RAID storage device based on a RAID storage system layout;
    generating the first multi-step command definition file for the first RAID storage device based on at least one capability of the RAID storage controller device; and
    generating the first multi-step command definition file for the first RAID storage device based on at least one RAID volume lifecycle event.

3. The system of claim 1, wherein the RAID storage controller device is configured to:
    determine that the RAID storage system configuration of the RAID storage system has changed;
    generate, based on the determination of the change in the RAID storage system configuration, a second multi-step command definition file for the first RAID storage device, wherein the second multi-step command definition file defines a subset of the plurality of first steps and at least one second step that includes at least one second operation;
    transmit the second multi-step command definition file to the first RAID storage device;
    generate, subsequent to transmitting the second multi-step command definition file, a second multi-step command that references the second multi-step command definition file and includes the at least one first parameter for use in performing one or more first operations included in the subset of the plurality of first steps defined by the second multi-step command definition file, and at least one second parameter for use in performing each at least one second operation included in the at least one second step defined by the second multi-step command definition file; and
    transmit the second multi-step command to the first RAID storage device.

4. The system of claim 1, wherein the plurality of first steps that each include at least one first operation include:
    performing a Direct Memory Access (DMA) read operation to read data from a memory subsystem in a host system;
    storing the data;
    performing a DMA write operation to write data to a second RAID storage device that is included in the RAID storage system; and
    transmitting a completion communication to the RAID storage controller device.

5. The system of claim 1, wherein the RAID storage controller device is configured to:
    generate, based on the RAID storage system configuration, a second multi-step command definition file for a second RAID storage device that is included in the plurality of RAID storage devices, wherein the second multi-step command definition file is different than the first multi-step command definition file and defines a plurality of second steps that each include at least one second operation;
    transmit the second multi-step command definition file to the second RAID storage device;
    generate, subsequent to transmitting the second multi-step command definition file, a second multi-step command that references the second multi-step command definition file and includes at least one second parameter for use in performing each at least one second operation included in the plurality of second steps defined by the second multi-step command definition file; and transmit the second multi-step command to the second RAID storage device.

6. The system of claim 1, wherein the transmitting the first multi-step command to the first RAID storage device includes providing a first multi-step command submission having an opcode that references the first multi-step command definition file.

7. The system of claim 1, further comprising:
the first RAID storage device that is included in the plurality of RAID storage devices and that is coupled to the RAID storage controller device, wherein the first RAID storage device is configured to:
  receive, from the RAID storage controller device, the first multi-step command definition file;
  store the first multi-step command definition file in a database;
  receive, from the RAID storage controller device subsequent to storing the first multi-step command definition file in the database, the first multi-step command;
  identify, in the database and based on the first multi-step command, the first multi-step command definition file; and
  perform one or more first operations included in each of the plurality of first steps in the first multi-step command.

8. An Information Handling System (IHS), comprising:
a processing system; and
a memory system that is coupled to the processing system and that includes instructions that, when executed by the processing system, cause the processing system to provide a Redundant Array of Independent Disks (RAID) storage controller engine that is configured to:
  identify a RAID storage system configuration of a RAID storage system that includes a plurality of RAID storage devices;
  generate, based on the RAID storage system configuration, a first multi-step command definition file for a first RAID storage device that is included in the plurality of RAID storage devices, wherein the first multi-step command definition file defines a plurality of first steps that each include at least one first operation;
  transmit the first multi-step command definition file to the first RAID storage device;
  generate, subsequent to transmitting the first multi-step command definition file, a first multi-step command that references the first multi-step command definition file and includes at least one first parameter for use in performing one or more first operations included in the plurality of first steps defined by the first multi-step command definition file; and
  transmit the first multi-step command to the first RAID storage device.

9. The IHS of claim 8, wherein the generating the first multi-step command definition file for the first RAID storage device based on the RAID storage system configuration includes at least one of:
  generating the first multi-step command definition file for the first RAID storage device based on a RAID storage system layout;
  generating the first multi-step command definition file for the first RAID storage device based on at least one capability of the RAID storage controller device; and
  generating the first multi-step command definition file for the first RAID storage device based on at least one RAID volume lifecycle event.

10. The IHS of claim 8, wherein the RAID storage controller engine is configured to: determine that the RAID storage system configuration of the RAID storage system has changed; generate, based on the determination of the change in the RAID storage system configuration, a second multi-step command definition file for the first RAID storage device, wherein the second multi-step command definition file defines a subset of the plurality of first steps and at least one second step that includes at least one second operation; transmit the second multi-step command definition file to the first RAID storage device; generate, subsequent to transmitting the second multi-step command definition file, a second multi-step command that references the second multi-step command definition file and includes the at least one first parameter for use in performing one or more first operations included in the subset of the plurality of first steps defined by the second multi-step command definition file, and at least one second parameter for use in performing each at least one second operation included in the at least one second step defined by the second multi-step command definition file; and transmit the second multi-step command to the first RAID storage device.

11. The IHS of claim 8, wherein the plurality of first steps that each include at least one first operation include: performing a Direct Memory Access (DMA) read operation to read data from a memory subsystem in a host system; storing the data; performing a DMA write operation to write data to a second RAID storage device that is included in the RAID storage system; and transmitting a completion communication to the RAID storage controller device.

12. The IHS of claim 8, wherein the RAID storage controller engine is configured to: generate, based on the RAID storage system configuration, a second multi-step command definition file for a second RAID storage device that is included in the plurality of RAID storage devices, wherein the second multi-step command definition file is different than the first multi-step command definition file and defines a plurality of second steps that each include at least one second operation; transmit the second multi-step command definition file to the second RAID storage device; generate, subsequent to transmitting the second multi-step command definition file, a second multi-step command that references the second multi-step command definition file and includes at least one second parameter for use in performing each at least one second operation included in the plurality of second steps defined by the second multi-step command definition file; and transmit the second multi-step command to the second RAID storage device.

13. The IHS of claim 8, wherein the transmitting the first multi-step command to the first RAID storage device includes providing a first multi-step command submission having an opcode that references the first multi-step command definition file.

14. A method for providing multi-step command for RAID storage devices, comprising:
  identifying, by a RAID storage controller device, a RAID storage system configuration of a RAID storage system that includes a plurality of RAID storage devices;
  generating, by the RAID storage controller device based on the RAID storage system configuration, a first multi-step command definition file for a first RAID storage device that is included in the plurality of RAID storage devices, wherein the first multi-step command definition file defines a plurality of first steps that each include at least one first operation;

transmitting, by the RAID storage controller device, the first multi-step command definition file to the first RAID storage device;
generating, by the RAID storage controller device subsequent to transmitting the first multi-step command definition file, a first multi-step command that references the first multi-step command definition file and includes at least one first parameter for use in performing one or more first operations included in the plurality of first steps defined by the first multi-step command definition file; and
transmitting, by the RAID storage controller device, the first multi-step command to the first RAID storage device.

15. The method of claim 14, wherein the generating the first multi-step command definition file for the first RAID storage device based on the RAID storage system configuration includes at least one of:
generating the first multi-step command definition file for the first RAID storage device based on a RAID storage system layout;
generating the first multi-step command definition file for the first RAID storage device based on at least one capability of the RAID storage controller device; and
generating the first multi-step command definition file for the first RAID storage device based on at least one RAID volume lifecycle event.

16. The method of claim 15, further comprising:
determining, by the RAID storage controller device, that the RAID storage system configuration of the RAID storage system has changed;
generating, by the RAID storage controller device based on the determination of the change in the RAID storage system configuration, a second multi-step command definition file for the first RAID storage device, wherein the second multi-step command definition file defines a subset of the plurality of first steps and at least one second step that includes at least one second operation;
transmitting, by the RAID storage controller device, the second multi-step command definition file to the first RAID storage device;
generating, by the RAID storage controller device subsequent to transmitting the second multi-step command definition file, a second multi-step command that references the second multi-step command definition file and includes the at least one first parameter for use in performing one or more first operations included in the subset of the plurality of first steps defined by the second multi-step command definition file, and at least one second parameter for use in performing each at least one second operation included in the at least one second step defined by the second multi-step command definition file; and
transmitting, by the RAID storage controller device, the second multi-step command to the first RAID storage device.

17. The method of claim 14, wherein the plurality of first steps that each include at least one first operation include:
performing a Direct Memory Access (DMA) read operation to read data from a memory subsystem in a host system;
storing the data;
performing a DMA write operation to write data to a second RAID storage device that is included in the RAID storage system; and
transmitting a completion communication to the RAID storage controller device.

18. The method of claim 14, further comprising:
generating, by the RAID storage controller device based on the RAID storage system configuration, a second multi-step command definition file for a second RAID storage device that is included in the plurality of RAID storage devices, wherein the second multi-step command definition file is different than the first multi-step command definition file and defines a plurality of second steps that each include at least one second operation;
transmitting, by the RAID storage controller device, the second multi-step command definition file to the second RAID storage device;
generating, by the RAID storage controller device subsequent to transmitting the second multi-step command definition file, a second multi-step command that references the second multi-step command definition file and includes at least one second parameter for use in performing each at least one second operation included in the plurality of second steps defined by the second multi-step command definition file; and
transmitting, by the RAID storage controller device, the second multi-step command to the second RAID storage device.

19. The method of claim 14, wherein the transmitting the first multi-step command to the first RAID storage device includes providing a first multi-step command submission having an opcode that references the first multi-step command definition file.

20. The method of claim 14, further comprising:
receiving, by the first RAID storage device from the RAID storage controller device, the first multi-step command definition file;
storing, by the first RAID storage device, the first multi-step command definition file in a database;
receiving, by the first RAID storage device from the RAID storage controller device subsequent to storing the first multi-step command definition file in the database, the first multi-step command;
identifying, by the first RAID storage device in the database and based on the first multi-step command, the first multi-step command definition file; and
performing, by the first RAID storage device, one or more first operations included in each of the plurality of first steps in the first multi-step command.

* * * * *